(12) United States Patent
Jubert

(10) Patent No.: US 8,693,127 B2
(45) Date of Patent: Apr. 8, 2014

(54) WRITING TIMING-BASED SERVO PATTERNS IN PERPENDICULAR AND NON-ORIENTED MAGNETIC MEDIA

(75) Inventor: Pierre-Olivier Jubert, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 408 days.

(21) Appl. No.: 13/014,924

(22) Filed: Jan. 27, 2011

(65) Prior Publication Data

US 2012/0194941 A1 Aug. 2, 2012

(51) Int. Cl.
*G11B 5/02* (2006.01)
*G11B 15/04* (2006.01)
*G11B 21/02* (2006.01)

(52) U.S. Cl.
USPC .................. 360/57; 360/55; 360/66

(58) Field of Classification Search
None
See application file for complete search history.

(56) References Cited

U.S. PATENT DOCUMENTS

| | | | | |
|---|---|---|---|---|
| 4,317,148 | A * | 2/1982 | Chi | 360/125.22 |
| 4,423,450 | A * | 12/1983 | Hamilton | 360/111 |
| 5,621,583 | A * | 4/1997 | Parks et al. | 360/81 |
| 6,885,513 | B1 | 4/2005 | Baker | |
| 6,970,312 | B2 * | 11/2005 | Yip et al. | 360/48 |
| 6,989,950 | B2 * | 1/2006 | Ohtsu | 360/48 |
| 7,149,045 | B1 * | 12/2006 | Mallary et al. | 360/55 |
| 7,283,317 | B2 * | 10/2007 | Dugas et al. | 360/48 |
| 7,551,380 | B2 | 6/2009 | Watson et al. | |
| 7,715,137 | B2 | 5/2010 | Albrecht et al. | |
| 8,310,780 | B2 * | 11/2012 | Imaino et al. | 360/75 |
| 2001/0033449 | A1 | 10/2001 | Hikosaka et al. | |
| 2003/0053235 | A1 | 3/2003 | Kikugawa et al. | |
| 2007/0091505 | A1 | 4/2007 | Koeppe | |
| 2010/0128384 | A1 | 5/2010 | Shibano | |
| 2010/0142077 | A1 | 6/2010 | Zaitsu et al. | |

OTHER PUBLICATIONS

Saito et al., A Novel Magnetic Printing Technique for Perpendicular Recording Media, Saito et al., IEEE Transactions on Magnetics, vol. 38, No. 5, Sep. 2002, pp. 2195-2197.

* cited by examiner

*Primary Examiner* — K. Wong
(74) *Attorney, Agent, or Firm* — Schmeiser, Olsen & Watts

(57) ABSTRACT

A method and apparatus for bipolar writing of servo marks to perpendicular and non-oriented magnetic recording medium. The method includes applying a varying current to a servo write head to alternately AC-erase and write sets of servo marks to regions of a servo track of a magnetic recording medium proximate to first and second write gaps, each servo mark of the sets of servo marks comprising first and second abutting magnetic domains of opposite magnetization directions, the magnetic recording medium moving with respect to the first and second write gaps in a recording direction, the magnetic recording medium being either (i) a perpendicular magnetic storage medium having magnetic particles with their easy axes oriented perpendicular to a top surface of the perpendicular storage medium or (ii) a non-oriented magnetic storage medium having magnetic particles with their easy axes randomly oriented relative to a top surface of the non-orientated storage medium.

21 Claims, 13 Drawing Sheets

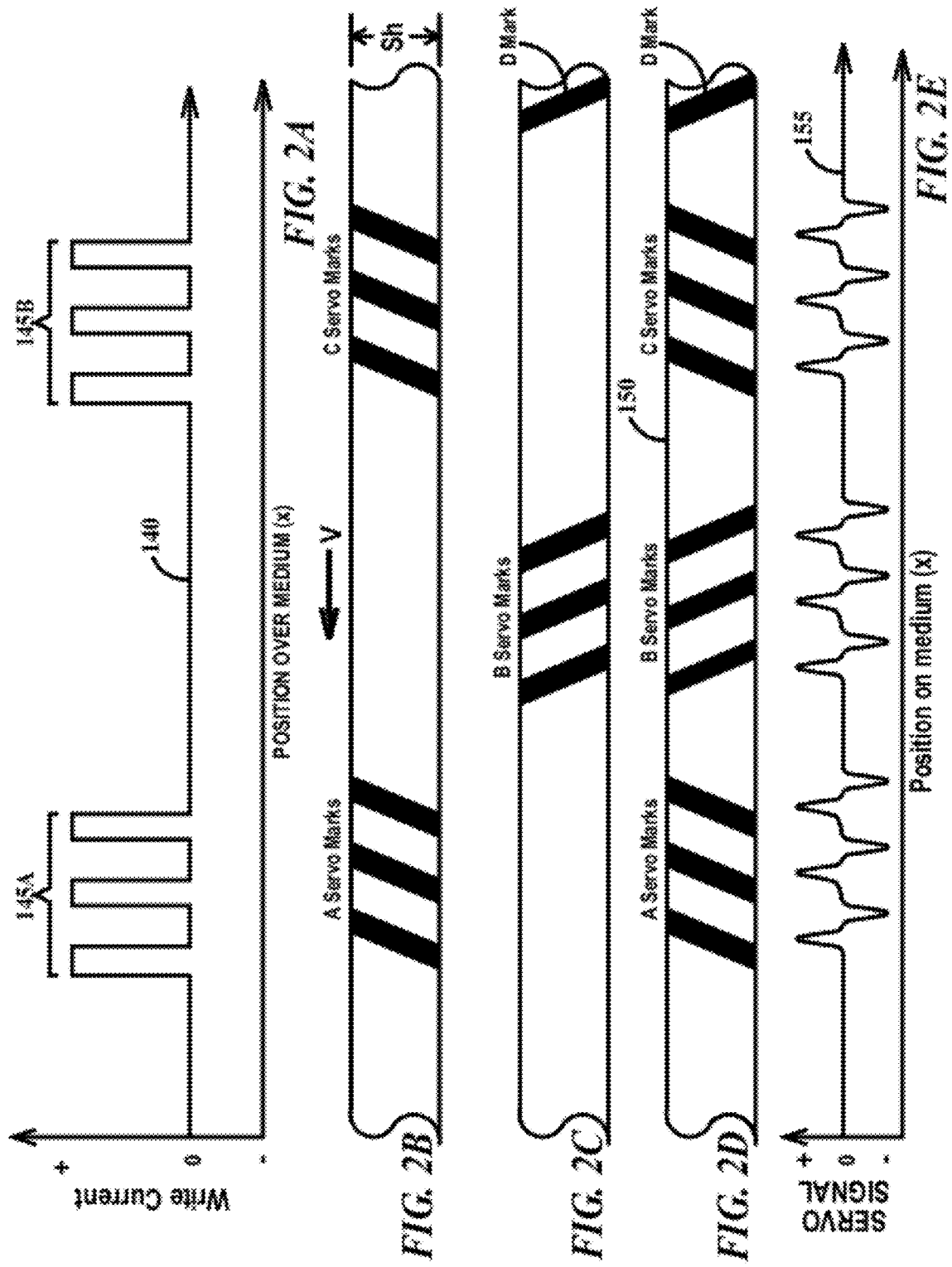

WRITING TIMING-BASED SERVO PATTERNS IN PERPENDICULAR AND NON-ORIENTED MAGNETIC MEDIA

FIELD OF THE INVENTION

The present invention relates to the field of writing servo marks on magnetic recording media; more specifically, it relates to apparatuses and methods for bipolar writing of servo marks to perpendicular and non-oriented magnetic recording media.

BACKGROUND

Magnetic recording systems (such as tape recording systems) record bits of information on a magnetic recording medium using a write/read head composed of write and read transducers. During both write and read operations, the recording heads need to be positioned accurately relative to recording data tracks of the magnetic recording medium. This is achieved by controlling the position of the write/read head in reference to servo marks prewritten on the magnetic recording medium. The position accuracy of the write/read data elements onto the data tracks strongly depends on how well the servo pattern is written on the medium and how well it can be decoded by the servo control system. Conventional tape media have their magnetic particles oriented along the longitudinal tape direction (longitudinally oriented media). However, perpendicularly oriented and non-oriented magnetic recording media have demonstrated better recording performances and may be preferred for use in high density recording tape systems. When a perpendicularly oriented or a non-oriented magnetic recording medium is written with the conventional servo write methods, the servo-signal obtained from the perpendicularly oriented or non-oriented magnetic medium presents a marked asymmetry in the signal pulse shape that can detrimentally affect tracking performance. Accordingly, there exists a need in the art to eliminate the deficiencies and limitations described hereinabove.

SUMMARY

A first aspect of the present invention is a method, comprising: applying a varying current to a servo write head having first and second write gaps to alternately AC-erase and write sets of servo marks to regions of a servo track of a magnetic recording medium proximate to the first and second write gaps, each servo mark of the sets of servo marks comprising first and second abutting magnetic domains of opposite magnetization directions, the magnetic recording medium moving with respect to the first and second write gaps in a recording direction, the magnetic recording medium being either (i) a perpendicular magnetic storage medium having magnetic particles with their easy axes oriented perpendicular to a top surface of the perpendicular storage medium or (ii) a non-oriented magnetic storage medium having magnetic particles with their easy axes randomly oriented relative to a top surface of the non-orientated magnetic storage medium.

A second aspect of the present invention is an apparatus, bipolar servo erase/write driver configured to generate a varying current to a servo write head to alternately AC-erase a segment of a servo track of a magnetic recording medium and write sets of servo marks to regions of the servo track proximate to the first and second write gaps, each servo mark of the sets of servo marks comprising first and second abutting magnetic domains of opposite magnetization direction, the servo write head having a first write gap and second write gap spaced apart and configured to generate corresponding magnetic fields proximate to the first and second write gaps when the varying signal is applied to servo write head by the bipolar servo erase/write driver; and a component that moves the magnetic recording medium past the first and second write gaps in a direction from the first write gap toward the second write gap, the magnetic recording medium being either (i) a perpendicular magnetic storage medium having magnetic particles with their easy axes oriented perpendicular to a top surface of the perpendicular magnetic storage medium or (ii) a non-oriented magnetic recording medium having magnetic particles with their easy axes randomly oriented to a top surface of the non-orientated magnetic storage medium.

These and other aspects of the invention are described below.

BRIEF DESCRIPTION OF THE DRAWINGS

The features of the invention are set forth in the appended claims. The invention itself, however, will be best understood by reference to the following detailed description of illustrative embodiments when read in conjunction with the accompanying drawings, wherein:

FIG. 2A is a plot of current levels versus magnetic storage medium position or time of a servo write signal to be applied to servo write heads for writing servo marks to a longitudinal magnetic recording medium;

FIG. 2B illustrates the servo marks written to the longitudinal magnetic storage medium by the left gap of the servo write head using the signal of FIG. 2A;

FIG. 2C illustrates the servo marks written to the longitudinal magnetic storage medium by the right gap of the servo write head using the signal of FIG. 2A;

FIG. 2D illustrates the composite servo marks written to the longitudinal magnetic storage medium by the left and right gaps of the servo write head using the signal of FIG. 2A;

FIG. 2E illustrates the servo-signal generated by the servo marks of FIG. 2D;

DETAILED DESCRIPTION

Conventional magnetic recording tape media have their magnetic (e.g., ferro-magnetic) particles oriented longitudinally, along the recording direction (e.g., the X direction, see FIG. 1). More specifically, the easy axis of the particles is preferentially along the recording direction of the medium. However, other orientations of the easy axes of the magnetic particles are possible. In perpendicular magnetic recording media, the easy axis of the particles is oriented perpendicular to the top surface of the medium (e.g., along the Z direction, see FIG. 1). In non-oriented magnetic recording media the magnetic easy axes are randomly oriented relative to the top surface of the medium. The write methods to record timing based servo marks on these latter media need to be different. The embodiments of the present invention describe new methods to write the timing-based servo marks on perpendicular and non-oriented media which result in servo-signals equivalent to those obtained from servo marks written on longitudinal media. Servo write current refers to the waveform or signal pattern used to write servo marks. Servo-signal refers to the waveform generated (or read) from the servo marks. Two servo-signal versus distance (or time) waveforms are defined as equivalent when the root mean square of the differences of a set of pre-defined sample points on the two normalized waveforms are within preset limits. Alternatively, two servo-signals are equivalent when substantially the same positioning of a data read/write head of a recording/playback apparatus relative to the magnetic recording medium is achieved using either servo-signal. While the embodiments of the present invention are described with respect to magnetic recording tape (hereafter magnetic tape or tape), magnetic recording (or storage) media having other form factors also contemplated, for example magnetic recording disks.

Figure 1A:
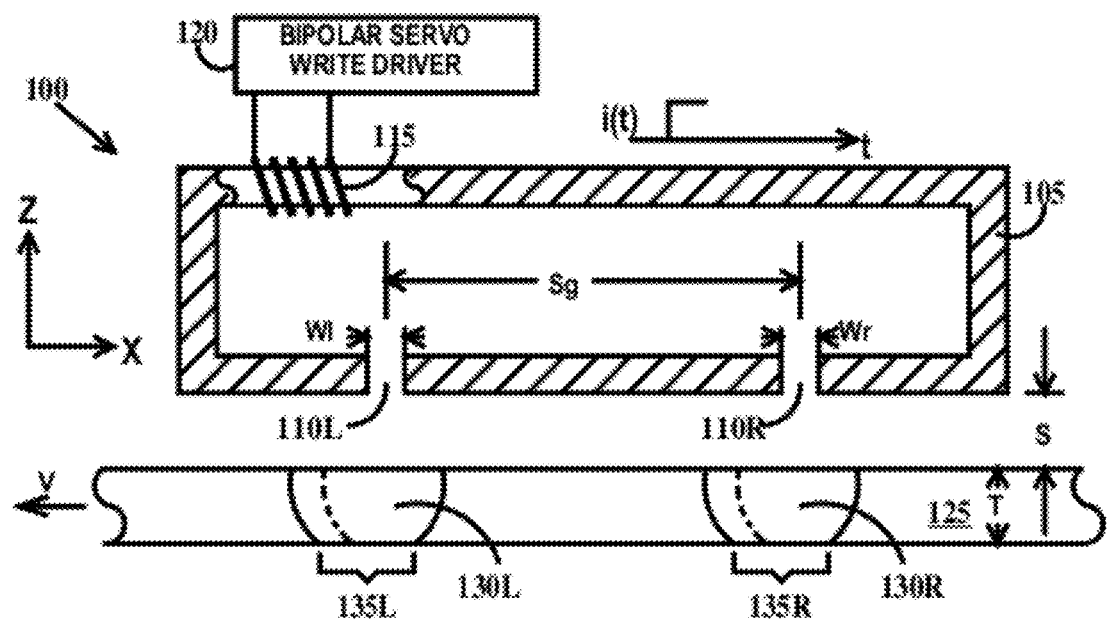
FIG. 1A is a cutaway cross-section view through line 1A-1A of FIG. 1B illustrating a servo write head according to an embodiment of the present invention.
Figure 1B:
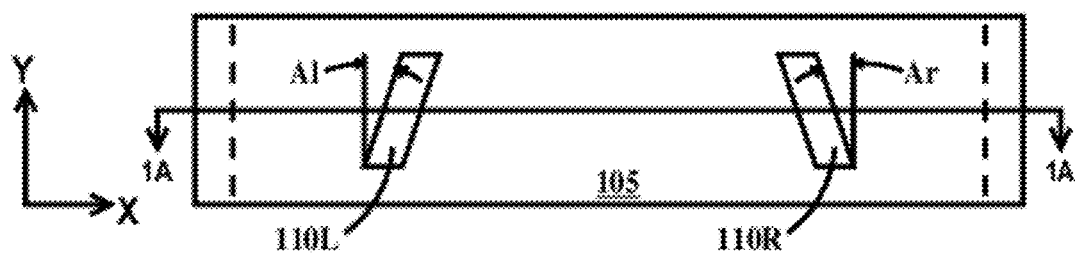
FIG. 1B is a bottom view of the servo write head of FIG. 1A.

FIG. 1A is a cutaway cross-section view through line 1A-1A of FIG. 1B illustrating a servo write head according to an embodiment of the present invention. In FIG. 1A, a dual-gap servo write head 100 includes ferromagnetic body 105 having a left gap 110L and a right gap 110R spaced a center-to-center distance Sg apart and an induction coil 115. Ferromagnetic body 105 need not be formed from iron but has the property of being ferromagnetic. Left and right gaps 110L and 110R have respective widths Wl and Wr. Induction coil 115 is electrically connected to a servo write driver 120 which generates a varying current signal that is applied to induction coil 115. Opposite ends of coil 115 are electrically connected to respective positive and negative current terminals of servo write driver 120. A magnetic tape 125 having a thickness T is spaced a distance S (in the Z-direction) under dual-gap servo write head 100 and is moving at a velocity V in the X-direction. When a current i(t) is applied to coil 115, a magnetic write bubble 130L is induced in magnetic tape 125 under gap 110L which magnetizes a region of the tape to form, in the case of a longitudinal magnetic storage medium, a magnetic domain 135L (see FIG. 3A). The same current i(t) induces a magnetic write bubble 130R in magnetic tape 125 under gap 110R which magnetizes a region of the tape to form, in the case of a longitudinal magnetic storage medium, a magnetic domain 135R. The magnetic domains 135L and 135R are wider (in the X-direction) than the write bubbles because magnetic tape 125 is moving from right to left while the write current i(t) remains at a constant positive value for a finite time duration.

Figure 3A:
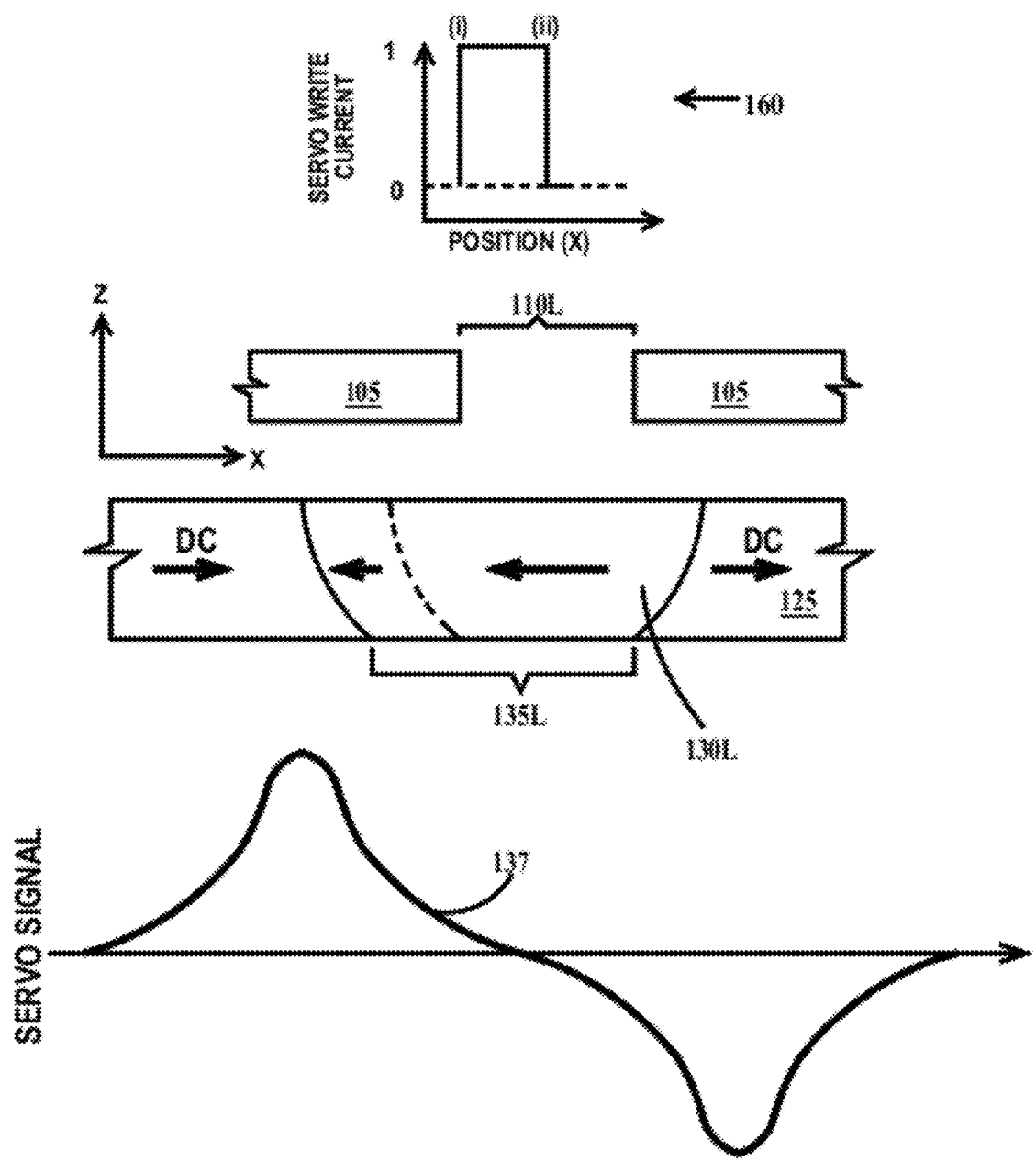
FIG. 3A is a diagram illustrating unipolar writing on a DC-erased longitudinal magnetic storage medium.

With reference to recording on a longitudinal magnetic storage medium, magnetic domains 135R and 135L are formed when the write field strengths generated by the gaps 110L and 110R are greater than the coercivity of the magnetic recording medium (Hc). Each write bubble 130L and 130R has two edges. The leading edge is the rightmost edge and the trailing edge is the leftmost edge. The average width (in the X-direction) of write bubbles 130L and 130R depends on the distance S, the amplitude of the write current, the widths Wl and Wr, and the coercivity of magnetic tape 125. For optimum write current, which maximizes the servo-signal output, the widths of write bubbles 130L and 130R are about the same as the widths of gaps 110L and 110R respectively. Wl and Wr may be the same or may be different. As can be seen, both regions 135L and 135R are written at the same time. Again with reference to recording on a longitudinal magnetic storage medium, the widths (in the X-direction) of regions 135L and 135R are a function of the velocity V of magnetic tape 125, the time duration of the current i(t), and the write bubble parameters discussed supra. Each region 135L and 135R is a magnetic domain (or stripe) with a constant magnetization direction (along the −X direction in this example) and is delimited by two magnetization transitions. With reference to FIG. 3A, the left magnetization transition is written in the medium by the trailing edge of the write bubble when the write current varies from 0 to 1 (point (i) of the servo write current waveform 160). The right magnetization transition is written in the medium by the leading edge of the write bubble when the write current transitions from 1 to 0 (point (ii) of the servo write current waveform 160).

FIG. 1B is a bottom view of the servo write head of FIG. 1A. In FIG. 1B, gaps 110L and 110R are trapezoidal in shape and are tilted in the Y-direction by respective angles Al and Ar. Gaps 110L and 110R are tilted toward each other. The X, Y and Z directions are mutually orthogonal. The magnitudes of angles Al and Ar may be the same or different.

Although magnetic tape 125 is depicted as under servo write heads 100, FIGS. 1A and 1B may be rotated 180° about the Y-axis so the magnetic tape passes over the servo write heads in which case FIG. 1B would depict the top surface of the servo write heads.

FIG. 2A is a plot of current levels versus magnetic recording medium position or time of a servo write signal to be applied to servo write heads for writing servo marks to a longitudinal magnetic storage medium. The X-scale of FIG. 2A may be converted from a position scale to a time scale by dividing the position scale by the velocity V of the magnetic tape past the servo write head. In the example of FIG. 2A, a servo write signal 140 is a series of two sets 145A and 145B of three positive unipolar current pulses to be applied to a previously DC-erased magnetic tape.

Magnetic tape passing by the gaps in the servo write head is magnetized when the applied current has sufficient amplitude (either positive or negative). In the present illustration, positive current writes the medium magnetization in the −X direction and is used for writing servo marks. As the sets of write pulses are applied a repeating series of A, B, C and D servo marks are written as illustrated in FIGS. 2B, 2C and 2D. In FIGS. 2B, 2C and 2D servo marks are illustrated by the solid black trapezoids. In FIG. 2D, servo marks A, B and C are illustrated and the start of servo marks D is illustrated.

FIG. 2B illustrates only the servo marks A and C written by the left gap of the servo write head using the signal of FIG. 2A. FIG. 2C illustrates only the servo marks B and D written to the magnetic tape medium by the right gap of the servo write head using the signal of FIG. 2A. FIG. 2D illustrates the composite servo marks written to magnetic tape 150 using the signal of FIG. 2A. Magnetic tape 150 was DC-erased in the +X direction prior to writing the servo marks.

A discussion of AC and DC-erase is appropriate at this point. DC-erase refers to passing the tape through a strong, constant magnetic field (produced from a recording head or a permanent magnet), which results in magnetic particles being locally magnetized in the same direction. AC-erase refers to passing the tape through a high-frequency alternating magnetic field. The magnetic particles are locally magnetized in opposite directions resulting in a medium with locally no net magnetization. With a recording head, AC-erase is achieved by the application of high-frequency current pulses with the current swinging between positive and negative. DC and AC erasing can be performed using additional write heads aligned with the servo write head. In this case it is called DC and AC pre-erase. An AC pre-erase can also be performed by using a degauss device prior to mounting the magnetic storage medium in a servo writer. When an AC-erase is included in the servo write signal it is called self-AC-erase.

For a longitudinal magnetic storage medium, if the medium is previously AC-erased the peak amplitude is half of what it would have been if the medium had been previously DC-erased along the +X direction. For a longitudinal medium, DC-erase produces larger servo-signal output but requires the use of a DC-erase head or permanent magnets that DC-erase the tape along the +X direction prior to servo writing.

FIG. 3A is a diagram illustrating unipolar writing on a DC-erased longitudinal magnetic storage medium. In FIG. 3A each servo mark is delimited by two magnetization transitions: a first magnetization transition from the +X direction to the −X direction, and a second magnetization transition from the −X direction to the +X direction. As discussed earlier, the position of these magnetization transitions is controlled by the duration of the write pulse and by the write bubble dimensions. These magnetization transitions in the longitudinal medium generate stray fields that result in a servo readback waveform consisting of a positive pulse followed by a negative pulse (see FIG. 3A). The positive and negative pulses of the servo-signal form a dipulse, whose characteristics directly depend on the relative position of the magnetization transition, the angle of the servo stripes and the servo reader dimensions. Note that, for a longitudinal magnetic storage medium, each of the pulses of the servo-signal dipulse is symmetric and of equal absolute amplitude (unless there is an undesired difference between the trailing edge and the leading edge of the write bubble). The relative positions of the positive and negative peaks of the servo-signal dipulse correlates with the relative position of the magnetization transitions, and can be adjusted with the duration of the servo write current pulse. FIG. 2E illustrates the servo-signal generated by the servo marks of FIG. 2D. In FIG. 2E, a servo-signal 155 generated by reading servo marks A, B and C is plotted versus the corresponding position on the magnetic tape 150 (see FIG. 2D). Note that the distance between two servo-signal dipulses is controlled by the time between consecutive write current pulses.

With a perpendicular magnetic storage medium and a non-oriented magnetic storage medium, writing with the same unipolar servo writing method leads to very different results. This is due to the sensitivity of these media to the perpendicular component of the fields generated by the servo write head.

A perpendicular magnetic storage medium is written when the field from the head is larger than the medium switching field. The resulting magnetization aligns itself with the direction of the Z component of the write field. The write head produces magnetic fields whose Z component points in opposite directions on each side of the write gap center. The magnetic domain configuration induced by the write bubble is therefore much different compared to the magnetic domain configuration of a longitudinal magnetic recording medium, as illustrated on the FIG. 3B.

Figure 3B:
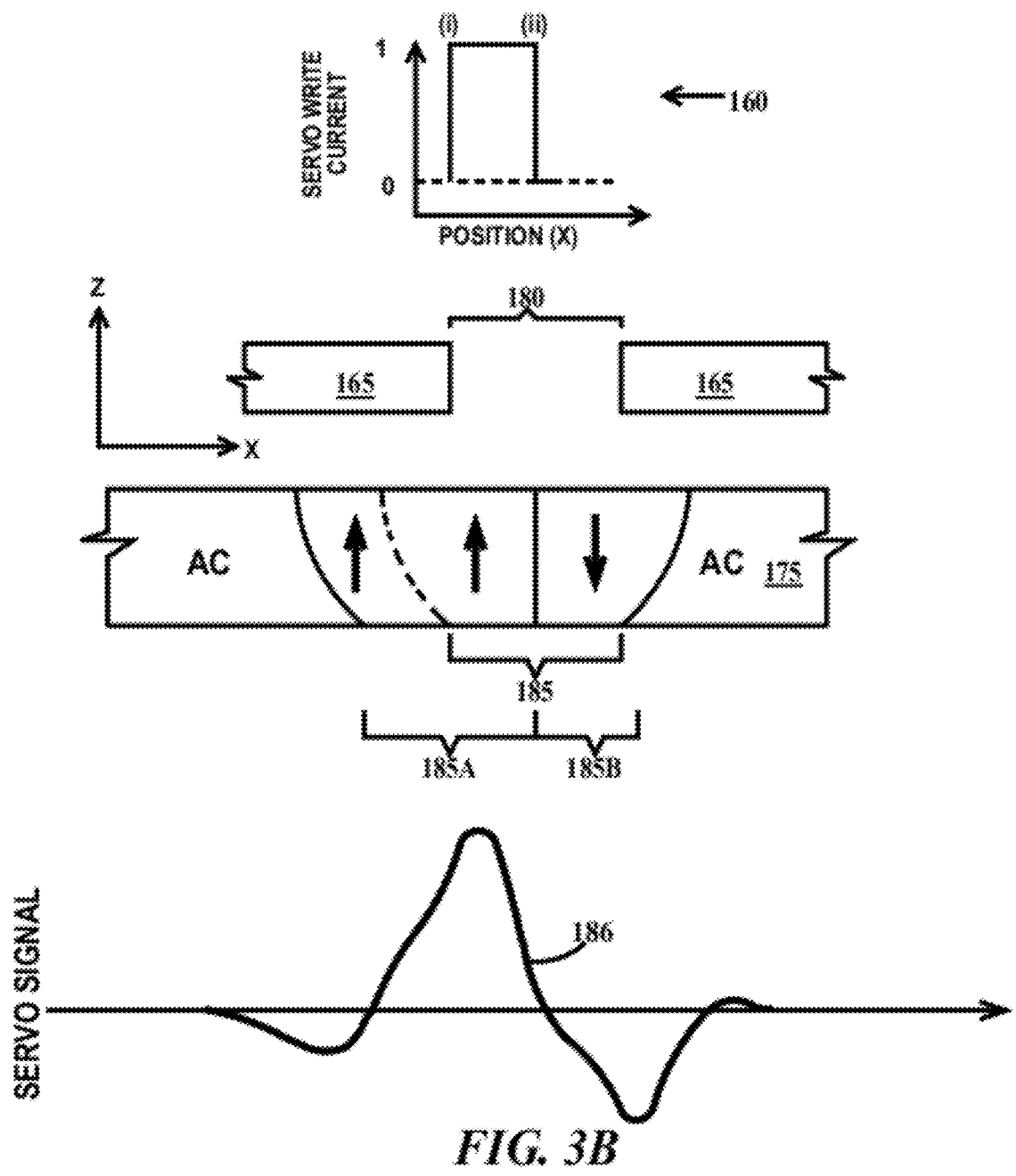
FIG. 3B is a diagram illustrating unipolar writing on a AC-erased perpendicular magnetic storage medium.

FIG. 3B is a diagram illustrating unipolar writing on an AC-erased perpendicular magnetic storage medium. In FIG. 3B, a servo write signal 160 is applied to a servo write head 165 to generate a write bubble 185 in a perpendicular magnetic storage medium 175 under write gap 180. With an AC-erased perpendicular magnetic storage medium, the servo mark is formed of two magnetic domains 185A and 185B (one with the magnetization pointing up, one with the magnetization pointing down). Down is the angular direction from the surface of the medium adjacent to the write head into the medium. Up is the direction from inside the medium to the surface of the medium adjacent to the write head. The regions of perpendicular magnetic storage medium 175 on ether side of the servo mark have been previously AC-erased. There are therefore three magnetization transitions, whose relative positions depend on the duration of the write pulse and on the write bubble dimensions. Because the finite duration of the unipolar write current pulse, one magnetization domain (up in this example) is wider than the other magnetization domain (down). In other words, the distance between the central magnetization transition and the left magnetization transitions is larger than the distance between the central magnetization transition and the right magnetization transitions. Note that the distance between the central magnetization transition and the right magnetization transition does not vary with the servo write pulse duration. It depends solely on the write bubble dimensions (i.e., on the write gap, the spacing S and the amplitude of the Maximum write current). For a perpendicular medium, a single and isolated magnetization transition generates stray fields that result in a symmetric dipulse: peak with negative (positive) amplitude followed by a peak with positive (negative) amplitude. For the magnetization configuration depicted in FIG. 3B, servo-signal 186 is the combination of the contributions of the three perpendicular magnetization transitions. Under the right conditions (which depend on the position of the transitions, servo stripe angle, servo reader dimensions), the servo-signal results in a waveform very close to a dipulse. However, because the transitions are not equidistant, the servo-signal dipulse of servo-signal 186 is not symmetric: the positive peak has higher absolute amplitude than the negative peak. Unipolar servo writing on AC-erased perpendicular magnetic storage medium may lead to a dipulse, but this dipulse is asymmetric due to the finite duration of the write current pulse. In addition, the relative distance of the positive and negative peaks can not be controlled by the servo write current.

Figure 3C:
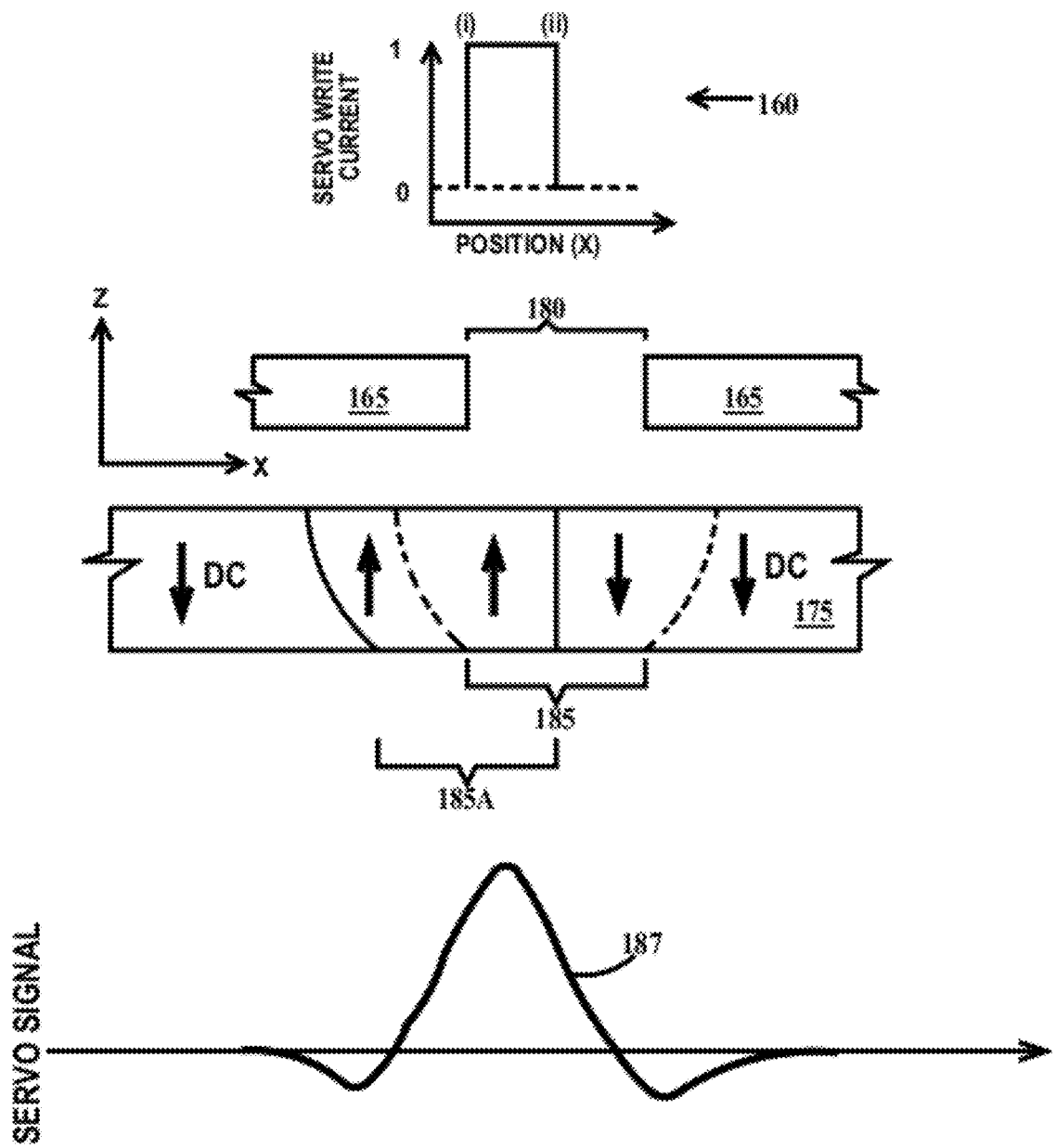
FIG. 3C is a diagram illustrating unipolar writing on a DC-erased perpendicular magnetic storage medium.

FIG. 3C is a diagram illustrating unipolar writing on a DC-erased perpendicular magnetic storage medium. The medium has been previously DC-erased with magnetization pointing down (in the −Z direction). The domain configuration that is a generated by the unipolar servo write pulse 160 results in an up domain 185A surrounded by down domains. Unipolar servo writing on previously DC-erased perpendicular magnetic storage medium results in two magnetization transitions: the first domain with magnetization direction from down to up is defined by the trailing edge of the write bubble when the current varies from 0 to 1 (point (i) of the servo write signal 160). The second domain with magnetization direction from up to down is defined under the center of the write gap when the write current transitions from 1 to 0 (point (ii) of the servo write signal 160). Note that the second transition may be noisier than the first transition because the write field gradient is smaller under the center of the write gap. The position of the two edges can be controlled by timing but the resulting servo-signal 187 is significantly different compared to the longitudinal case of FIG. 3A, having a waveform that resembles a single polarity pulse. This shape servo-signal can be detrimental for servo-signal decode.

Thus, conventional servo write methods can not write servo marks on a perpendicular medium or a non-oriented medium that result in symmetric servo-signal dipulses that are similar to those obtained from servo marks written to a longitudinal medium, and where the servo-signal characteristics (dipulse shape, peak-to-peak distance, etc) can be conveniently controlled by the servo write waveform.

A non-oriented magnetic storage medium is written when the field from the head is larger than the medium switching field and the resulting average magnetization in the write bubble aligns itself with the fields generated by the write head.

Figure 3D:
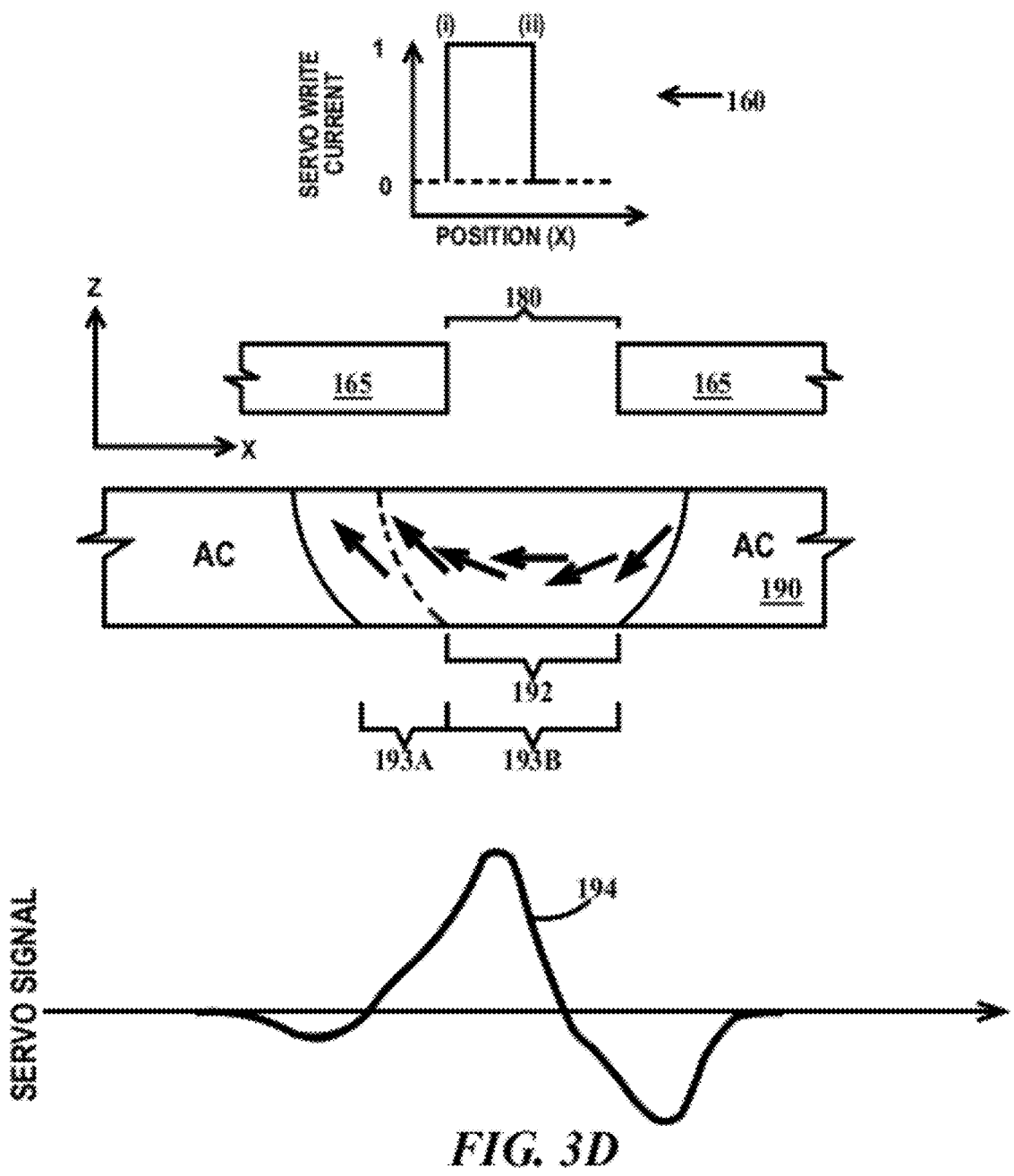
FIG. 3D is a diagram illustrating unipolar writing on an AC-erased non-oriented magnetic storage medium.

FIG. 3D is a diagram illustrating unipolar writing on an AC-erased non-oriented magnetic storage medium. In FIG. 3D, servo write signal 160 (the same as in FIG. 3A) is applied to servo write head 165 to generate a write bubble 192 in a non-oriented magnetic storage medium 190 under write gap 180. The generated overall magnetization in write bubble 192 is thus very different from that obtained with a longitudinal medium (e.g., a single magnetic domain with magnetization along −X, e.g., 180°). Due to the finite duration of the servo write pulse, the magnetization configuration in the servo mark is asymmetric: to the left of the servo mark, there is a region 193A with its magnetization at a constant 130 degrees over a distance that corresponds to the pulse duration times the tape velocity. In region 193B magnetization varies from near 130° below the left edge of write gap 180 to 180° or near 180° under the center of write gap 180, and to near −130° below the right edge of write gap 180. (Angles are values from the X-direction). In FIG. 3D, the regions of non-oriented magnetic recording medium 190 on either side of servo mark had been previously AC-erased.

Comparing the simulations of servo-signals for a perpendicular magnetic storage medium to simulations of servo-signals to a non-oriented magnetic storage medium under the same conditions yields curves that are remarkably and unexpectedly similar. Under the right conditions (which depend on the angular variation of the magnetization in the servo stripe, the servo stripe angle and the servo reader dimensions), the servo-signal results in a waveform close to a dipulse. However, because of the asymmetric magnetization profile, the servo-signal 194 is asymmetric: the positive peak has higher absolute amplitude than the negative peak of the dipulse. In addition, the peak-to-peak distance can not be controlled by the servo write current.

For both a perpendicular magnetic storage medium and a non-oriented magnetic storage medium, symmetric servo dipulse (similar to that obtained with a longitudinal medium) can be obtained by using bipolar servo writing with a write signal of the present invention. As discussed supra, to achieve equivalent servo-signal dipulses on perpendicular media that are similar to that obtained with longitudinal media, the servo stripes need to consist of a succession of two abutting localized domains, one magnetized down (up) and one magnetized up (down), surrounded by an AC-erased region.

Figure 3E:
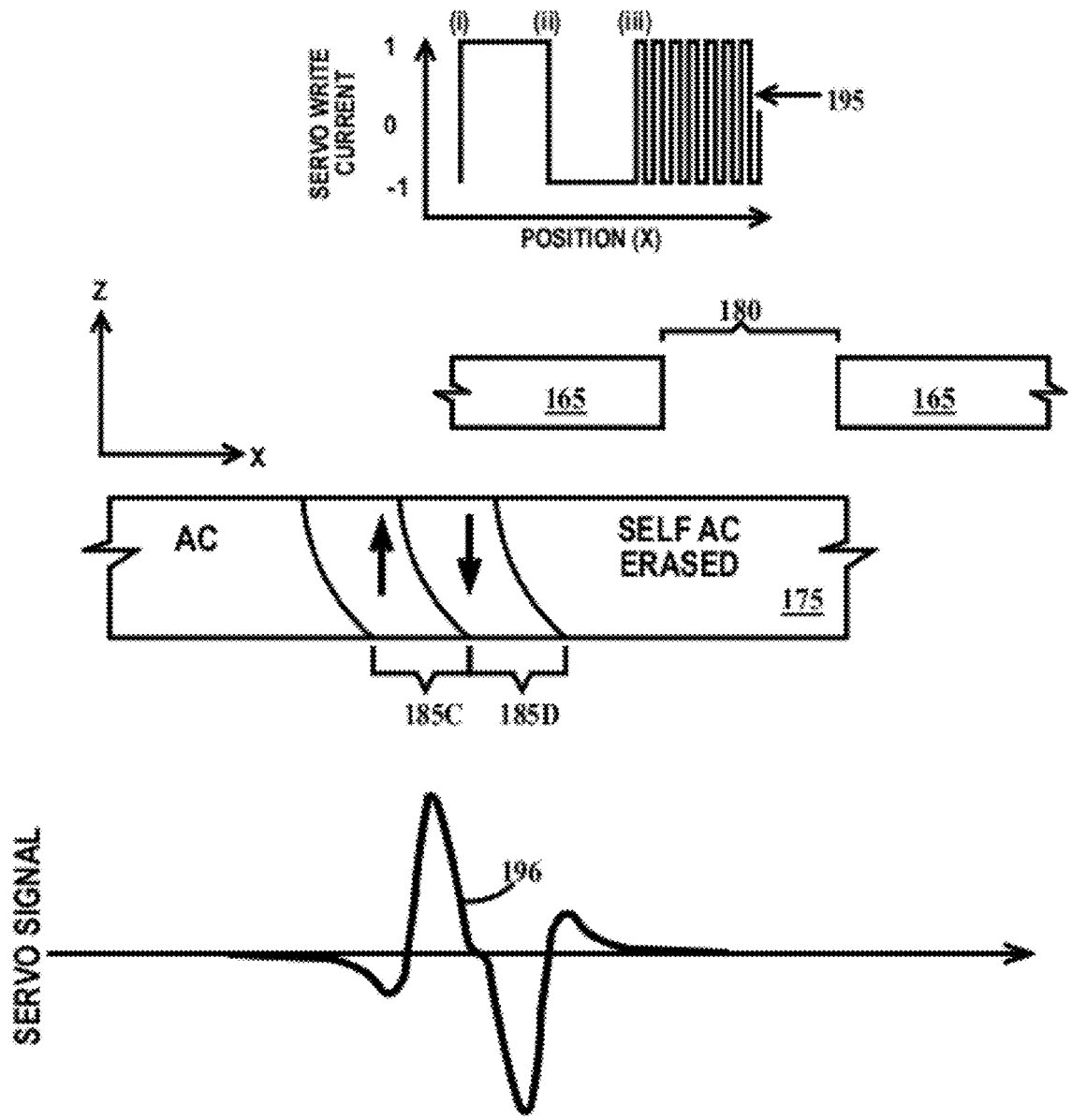
FIG. 3E is a diagram illustrating bipolar writing on an AC-erased perpendicular magnetic storage medium.

FIG. 3E is a diagram illustrating bipolar writing on an AC-erased perpendicular magnetic storage medium. The transition is written only with the trailing edge of the write bubble. The relative position of all transitions can be controlled by timing only: in FIG. 3E, the left transition (from AC-erased to magnetization up) is defined at the trailing edge of the write bubble when the current transitions to +1 (point (i) of servo write current 195). The second magnetization transition (from magnetization up to magnetization down) is defined at the trailing edge of the write bubble when the current transitions from +1 to −1 (point (ii) of servo write current 195). The third magnetization transition (from magnetization down to self-AC-erased) is defined at the trailing edge of the write bubble with the current changes from −1 to a high frequency servo write signal (point (iii) of the servo write current 195). The high frequency servo write signal after point (iii), self-erases the tape after defining the third magnetization transition. The magnetization in regions 185C and 185D are in opposite directions. The corresponding servo-signal 196 has the desired dipulse, as revealed by servo write/read simulations. The resulting servo-signal 196 has a remarkably and unexpectedly similar waveform to the servo-signal dipulse obtained for a longitudinal magnetic storage medium (137 of FIG. 3A). Note that the relative position of all three magnetization transitions, and therefore the characteristics of the servo dipulse, can be adjusted with the write current waveform independently of the write gap, write current, head spacing, etc. The write gap, write current, head spacing, etc. can be selected to reduce the transition noise and thereby improve the servo-signal to noise ratio. The optimum locations of the three magnetization transitions (or the size of the two abutted domains) depend on the servo stripe angle and the servo reader dimensions.

Similarly, symmetric dipulses can be obtained with bipolar servo writing on a non-oriented medium. The position of each transition is again solely controlled by the write current waveform. The characteristics of the servo dipulse, can be adjusted with the write current waveform and are independent of the write gap, write current, head spacing, etc. The write gap, write current, head spacing, can be selected to reduce the transition noise and thereby to improve the servo-signal to noise ratio. The optimum locations of the three magnetization transitions (or the size of the two domains) depend on the servo stripe angle and the servo reader dimensions.

Figure 3F:
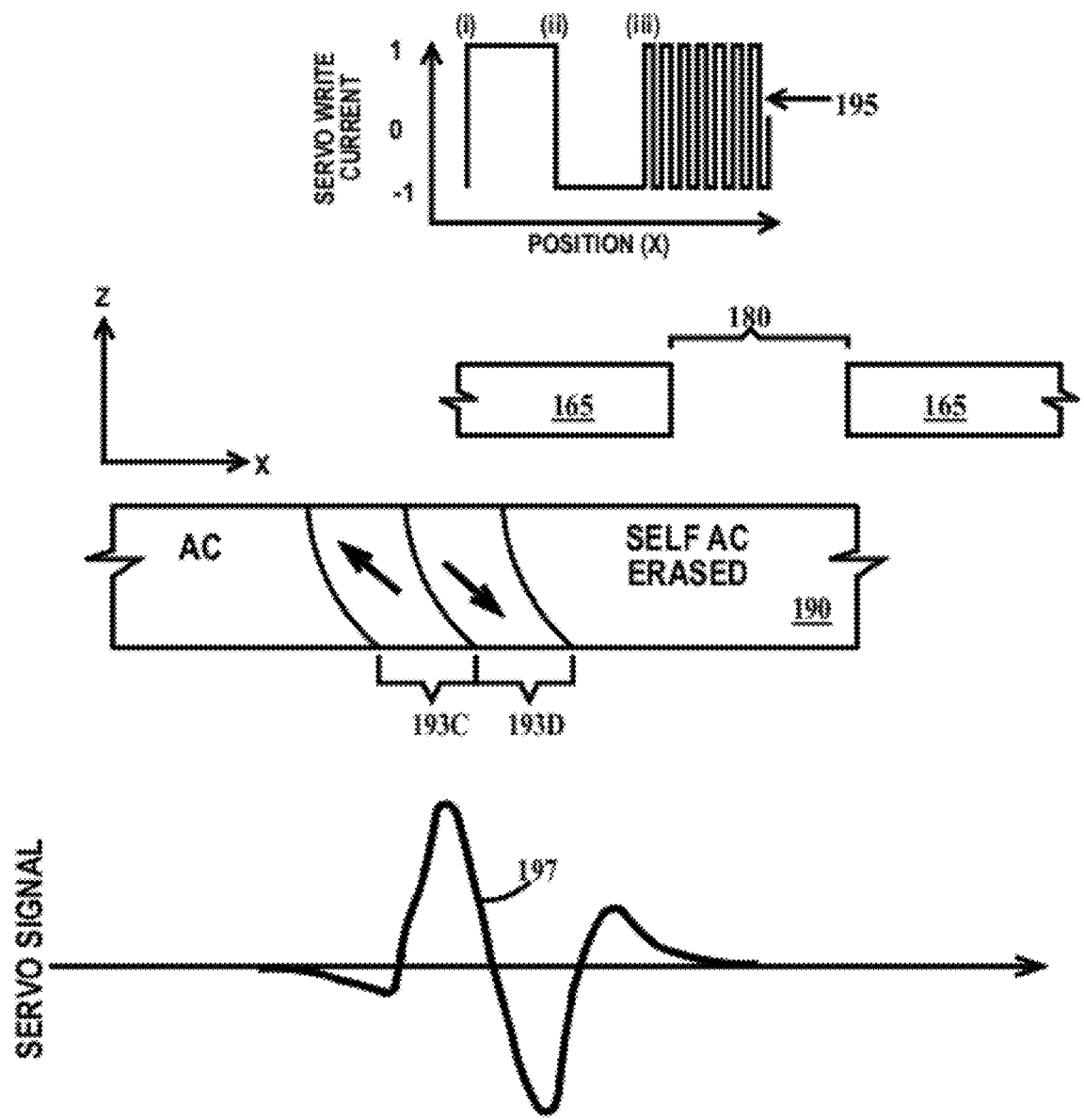
FIG. 3F is a diagram illustrating bipolar writing on an AC-erased non-oriented magnetic storage medium.

FIG. 3F is a diagram illustrating bipolar writing on an AC-erased non-oriented magnetic storage medium. Servo write signal 195 (the same as in FIG. 3E) is applied to servo write head 165 to write a servo mark composed of two abutted magnetic domains 193C and 193D of opposite magnetization direction and to self-AC-erase the medium 190 after writing the servo mark. The resulting servo-signal 197 has a remarkably and unexpectedly similar waveform to servo-signal dipulse obtained for a longitudinal magnetic storage medium (137 of FIG. 3A).

Figure 4:
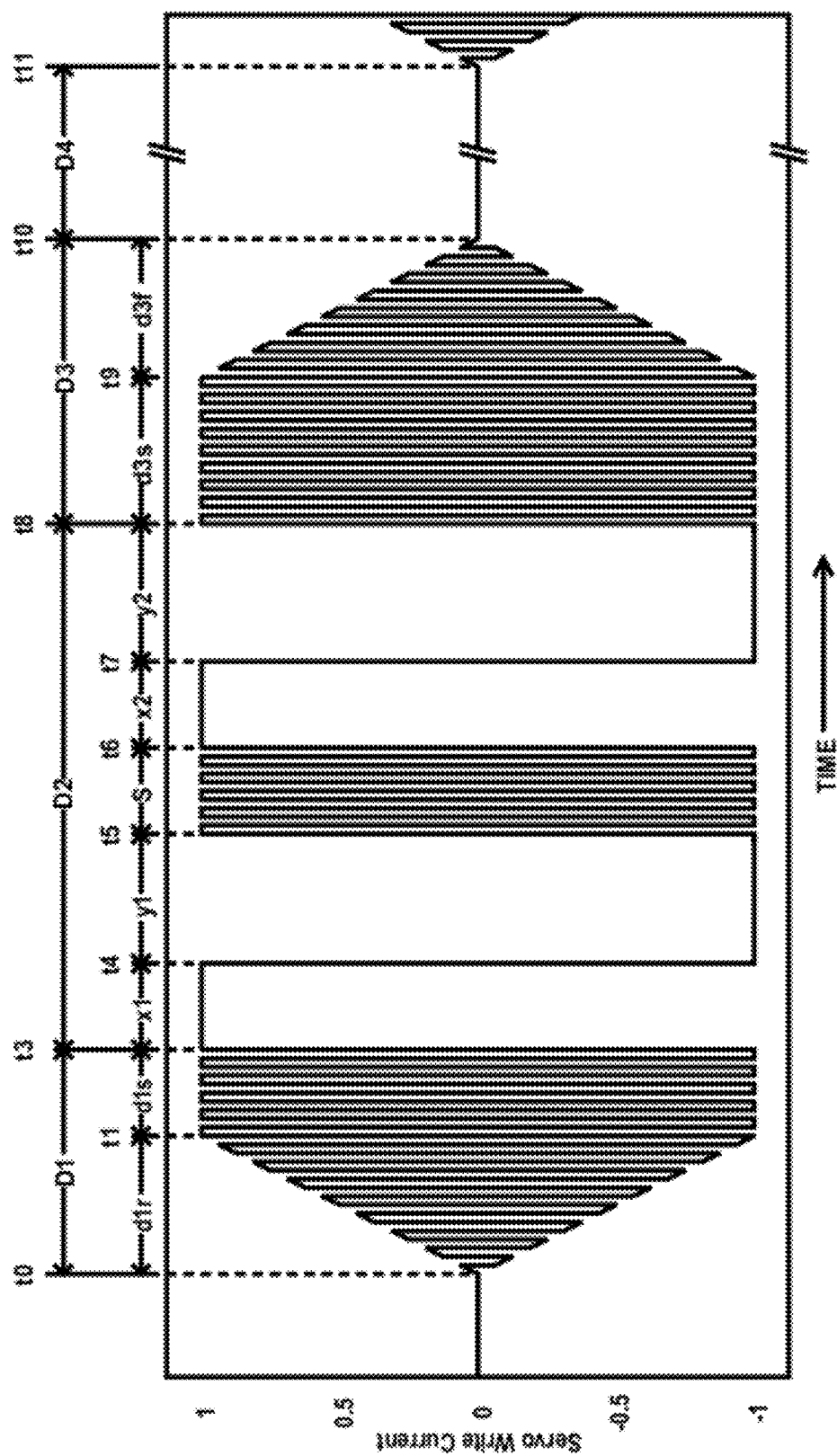
FIG. 4 is a plot of servo write current versus time for general servo write signal pattern for writing servo marks to a perpendicular magnetic recording medium and to a non-oriented magnetic recording medium according to embodiments of the present invention.

The embodiments of the present invention use a single write head with multiple write gaps and a bi-polar servo current write driver. The write driver can provide positive and negative currents to the multiple gap write head and can be turned off (no current, or small enough current) at defined times to avoid overwriting the servo marks. The write signal pattern to define the servo write timing is illustrated in FIG. 4 and described infra. The servo write method utilizes trailing edge writing wherein the written magnetization and the magnetization transitions are defined at the trailing edge of the write bubble. In addition, the dipulse positions, the dipulse shapes and their peak-to-peak distance in the servo-signal are controlled by the servo write current pattern, independently of the size of the write gap or of the maximum write current amplitude. The method is well adapted for servo writers with small gaps and lower impedance, which allows servo mark writing with lower write currents and faster rise times than with unipolar servo write methods. The write signal pattern of FIG. 4 not only allows for control of servo-signal sharpness and amplitude but also allows for tailoring servo-signal asymmetry.

The embodiments of the present invention all use a same general servo write signal pattern that may be used with or without pre-AC or pre-DC-erase. The general servo write signal pattern includes self-AC-erase regions regardless of whether or not the magnetic tape has been pre-AC-erased or pre-DC-erased. The embodiments of the present invention use a single multi-gap servo write head and the servo track is written in a single pass. Finally the same general servo write pattern is used for both a perpendicular magnetic recording medium and a non-oriented magnetic recording medium.

FIG. 4 is a plot of servo write current versus time for a general servo write signal pattern for writing servo marks to a perpendicular magnetic storage medium and to a non-oriented magnetic storage medium according to embodiments of the present invention. It is convenient to describe the various regions of the general pattern servo write signal in terms of time regions. The time interval between a time t0 and a time t3 becomes region D1. The time interval between time t3 and a time t8 becomes region D2. The time interval between time t8 and a time t10 becomes region D3. The time interval between time t10 and a time t11 becomes region D4. Region D1 is divided into self-AC-erase regions d1r and d1s so the time interval between time t0 and a time t1 is region d1r and the time interval between time t3 and t1 is region d1s. Region D2 is divided into servo write regions x1, y1, self-AC-erase region S, and servo write regions x2 and y2 so the time interval between time t3 and a time t4 is region x1, the time interval between time t4 and a time t5 is region y1, the time interval between time t5 and time t6 is region S, the time interval between time t6 and a time t7 is region x2 and the time interval between time t7 and a time t8 is region y2. Region D3 is divided into self-AC-erase regions d3s and d3f so the time interval between time t8 and a time t9 is region d3s and a time interval between time t9 and time t10 is region d3f.

Regions D1, S, D3 correspond to periods of high-frequency write current oscillations between negative and positive currents which self-AC-erases the magnetic tape. A high-frequency current isolation is defined as a frequency of at least 5 MHz. Over region d1r, the current oscillates about zero and ramps up from zero to a maximum positive and negative write currents of normalized 1 and −1. The actual maximum current negative and positive values in amperes are selected based on the physical and magnetic properties of the magnetic medium and the physical and electrical parameters of the servo write head. In region d1s the current oscillates between the maximum positive and negative write currents. In region x1 the write current is held at the maximum positive write current and in region y1 the write current is held at the maximum negative write current. The current steps from 1 to −1 at time t4. Servo mark write regions x1 and y1 write a first servo mark of two adjacent stripes of opposite magnetic direction from which a first dipulse in the servo-signal will be generated. In region x2 the write current is held at the maximum positive write current and in region y2 the write current is held at the maximum negative write current. The current steps from 1 to −1 at time t7. Servo write regions x2 and y2 write a second servo mark of two adjacent stripes of opposite magnetic direction from which a second dipulse in the servo-signal will be generated. Region S defines the spacing between the first and second servo marks and hence the timing between the first and second dipulses of the servo-signal. Over region S, the current oscillates between the maximum positive and negative write currents of 1 and −1. In region d3s the current oscillates between the maximum positive and negative write currents. Over region d1f, the current oscillates about zero and ramps down to zero from the maximum positive and negative write currents.

Region D3 serves to transition the write current from maximum positive and negative write currents values to zero write current. Region D3 is necessary to suppress any undesirable additional dipulse due to leading edge writing. Region D1 is in principle not necessary (e.g., is optional) but may be required in practical applications. Region D4 prevents overwriting with one gap the magnetic domains that were written with the other gap of the dual gap servo write head.

It should be understood that FIG. 4 describes a general write signal that will produce servo marks sets of two marks (each mark made up of adjacent stripes). By "removing" regions S, x2 and y2 servo mark sets of one servo mark each will be produced. By adding N−1 (where N is a positive integer larger than 1) groups of regions S, x2 and y2 servo mark, sets of N servo marks will be produced. In FIG. 4, N=2. In one example, x1=x2 and y1=y2 where x1 is not equal to y1 and x2 is not equal to y2. In one example, x1=y1=x2=y2. The current ramp of region d1r is optional. It should be also understood that an alternative servo write signal pattern can be obtained by rotating the pattern of FIG. 4 180° about an axis of zero current so, for example, the current steps from −1 to 1 instead of 1 to −1 in region D2.

Figure 5:
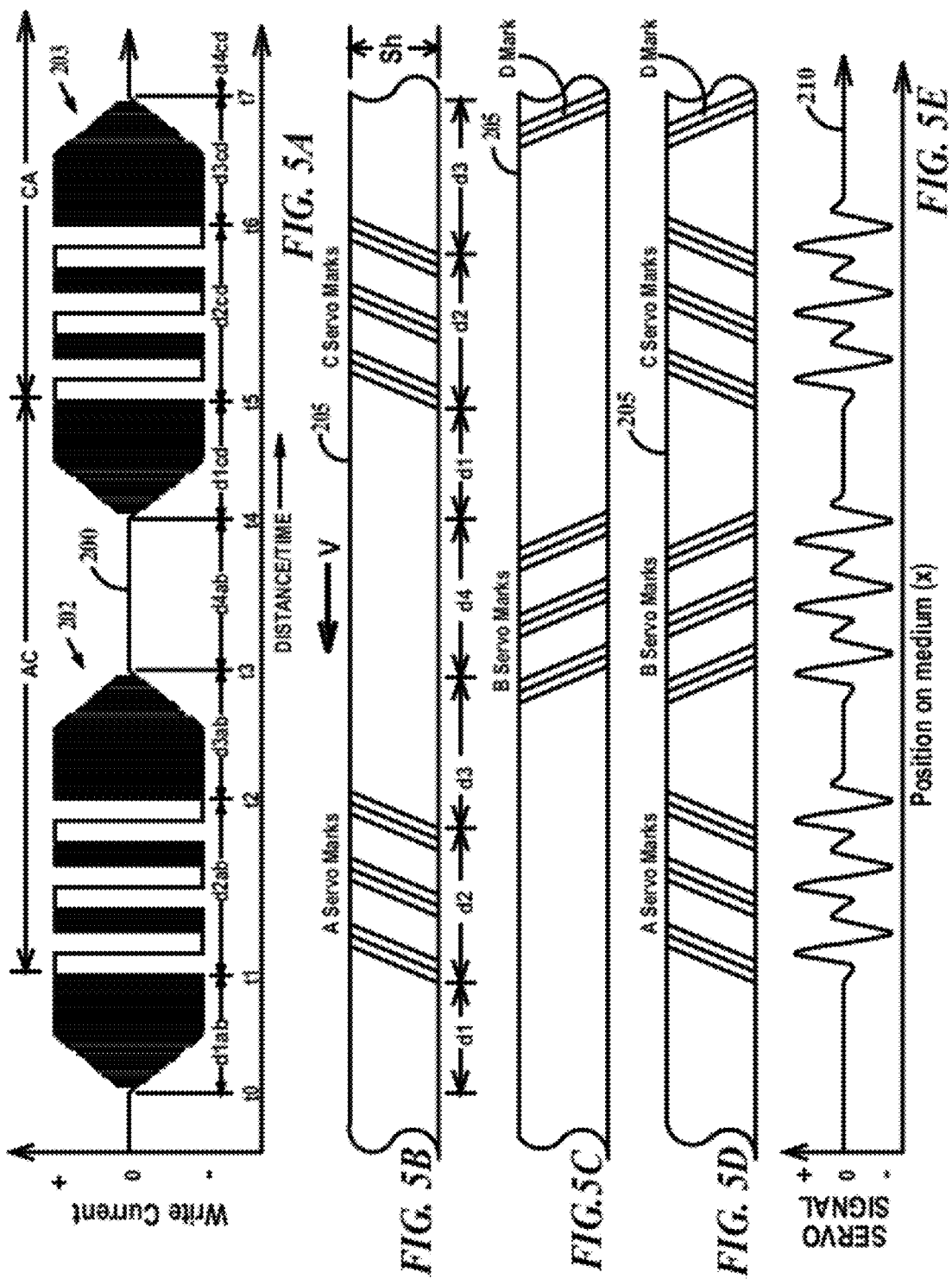
FIG. 5A is a plot of current levels versus medium position or time of a servo write signal to be applied to servo write heads when writing a perpendicular or non-oriented magnetic storage medium according to embodiments of the present invention.
FIG. 5B illustrates the servo marks written to the perpendicular or non-oriented magnetic storage medium by the left gap of the servo write head using the signal of FIG. 5A.
FIG. 5C illustrates the servo marks written to the perpendicular or non-oriented magnetic storage medium by the right gap of the servo write head using the signal of FIG. 5A.
FIG. 5D illustrates the composite servo marks written to the perpendicular or non-oriented magnetic storage medium by the left and right gaps of the servo write head using the signal of FIG. 5A.
FIG. 5E illustrates the servo-signal generated by the servo marks of FIG. 5D.

FIG. 5A is a plot of current levels versus medium position or time of a servo write signal 200 to be applied to servo write heads when writing a perpendicular or a non-oriented magnetic storage medium according to embodiments of the present invention. In FIG. 5A, two identical servo write signal patterns 202 and 203 are illustrated. It should be understood that additional identical servo write signal patterns continue on the right of the plot for as many servo marks that are to be written. Also the servo write signal pattern of FIG. 5A differs from the general servo write signal pattern of FIG. 4 by having three regions where servo marks are written instead of two. Again, three regions are to be considered exemplary and there may be as few as one or more than three.

The X-coordinate of FIG. 5A may be converted from position to time by dividing the position by the velocity (V) of the magnetic tape past the servo write head. For example, dividing the position by V gives the corresponding time. When write current is plotted versus the position of the moving magnetic tape relative to the servo write head the tape segments d1ab, d2ab, d3ab, d4ab, d1cd, d2cd, d3cd and d4cd are used. By dividing by V, d1$ab$ becomes a time interval between a time t0 and a time t1, d2$ab$ becomes an interval between time t1 and a time t2, d3$ab$ becomes a time interval between time t2 and a time t3, d4$ab$ becomes a time interval between time t3 and a time t4, d1$cd$ becomes a time interval between time t4 and a time t5, d2$cd$ becomes a time interval between time t5 and a time t6, d3$cd$ becomes a time interval between time t6 and a time t7, and d4$cd$ becomes a time interval between time t7 and a time t8 (not shown). Time t8 is the next t0. When write current is plotted versus the time, the times t0, t1, t2, t3, t4, t5, t6, t7 and t8 are used.

In terms of tape position, the distances d1$ab$ and d1$cd$ correspond to d1 of FIG. 4; the distances d2$ab$ and d2$cd$ correspond to d2 of FIG. 4 and the distances d3$ab$ and d3$cd$ correspond to d3 of FIG. 4. In terms of time, the time intervals between t0 and t1 and between t4 and t5 correspond to d1 of FIG. 4; the time intervals between t1 and t2 and between t5 and t6 correspond to d2 of FIG. 4 and the time intervals between t2 and t3 and between t6 and t7 correspond to d3 of FIG. 4. Between time t0 and t3 a set of three of A and three B servo marks are written and between times t4 and t7 a set of three of C and three D servo marks are written. In distance d4$cd$ the current is zero or near zero to avoid overwriting the servo marks when the left gap passes over the servo marks written by the right gap. The same sequence can be repeated for additional A and B servo mark pairs and additional C and D servo marks pairs. Note because servo write signal patterns 202 and 203 each contain three groups of servo mark writing (FIG. 4 had two) each A, B, C and D servo mark set will contain three servo marks and each servo mark will be made up of adjacent stripes of opposite magnetic polarity (see FIG. 5D). A distance AC is defined between times t1 of a first servo write signal pattern 202 and t5 of the second servo write signal pattern 203. A distance CA is defined between t5 of servo write signal pattern 203 and the next t1 of a next servo write signal pattern (not shown).

In FIGS. 5B, 5C and 5D each servo mark is illustrated by a pair of adjacent trapezoids.

FIG. 5B illustrates the servo marks written to a perpendicular or non-oriented magnetic storage medium 205 by the left gap of the servo write head using the signal of FIG. 5A. The A and C servo mark sets each contain three servo marks and each servo mark is made up of two adjacent magnetic domains (or magnetic stripes) of opposite magnetization orientation. In FIG. 5B, distances d1, d2, d3 and d4 associated with the A servo marks are the same as the d1$ab$, d2$ab$ and d3$ab$ and d4$ab$ distances of FIG. 5A, and distances d1, d2, d3 and d4 associated with the C servo marks are the same as the d1$cd$, d2$cd$ and d3$cd$ and d4$cd$ distances of FIG. 5A. Distances d1, d2, d3 and d4 of FIG. 5B correspond to D1, D2, D3 and D4 of FIG. 4.

FIG. 5C illustrates the servo marks written to the perpendicular or non-oriented magnetic tape medium by the right gap of the servo write head using the signal of FIG. 5A. The B and D servo mark sets each contain three servo marks and each servo mark is made up of two adjacent magnetic domains (or magnetic stripes) of opposite magnetization orientation. Only one mark of the D set is illustrated.

FIG. 5D illustrates the composite servo marks written to the perpendicular or non-oriented magnetic tape medium by the left and right gaps of the servo write head using the signal of FIG. 5A. Again, the A, B, C and D servo mark sets each contain three servo marks and each servo mark is made up of two adjacent magnetic domains (or magnetic stripes) of opposite magnetization orientation. Again, only one mark of the D set is illustrated.

FIG. 5E illustrates the servo-signal generated by the servo marks of FIG. 5D. In FIG. 5E, a servo-signal 210 generated by reading servo marks A, B and C is plotted versus the corresponding position on the medium as in FIGS. 5A through 5E. Servo-signal 210 of FIG. 5E should be compared to servo-signal 155 of FIG. 2E to see how remarkably and unexpectedly similar the two servo-signals are.

Since the sequence of servo mark pairs AB-CD-AB-CD-etc. is written with two gaps, it is important to apply the correct sequence of write currents to prevent overwriting the B servo-marks with the left gap of the servo writer. In addition, self-AC-erase between A-B, B-C, C-D, D-A servo marks with the use of a single servo write head is achieved but this adds restrictions on servo mark pattern achievable as discussed infra.

Also, it should be understood that by having a different number of servo write regions in servo write signal pattern 202 than in servo write signal pattern 203 the number of servo marks in the AB servo mark pairs may be different from the number of servo marks in the CD servo mark pairs.

From FIGS. 5A through 5D the following two equations can be defined:

$$AC = d2ab + d3ab + d4ab + d1cd \quad (1)$$

$$CA = d2cd + d3cd + d4cd + d1ab \quad (2)$$

With d1$ab$, d3$ab$, d1$cd$ and d3$cd$ as unknowns, there are eight conditions for writing servo marks with self-AC-erase of the servo track (no need for pre-erase step) that, when met, result in no overwriting of servo marks. These conditions are given by the inequalities in Table I:

TABLE I

| | In order that: | The following condition must be satisfied: |
|---|---|---|
| 1 | There be no overwrite of B marks after d3ab | d3ab < AB − [(Sh/2)*(tan(Al) + tan(Ar))] − d2ab − Wl |
| 2 | There be full AC-erase between marks A and B | d1ab + d3ab > AB + [(Sh/2)*(tan(Al) + tan(Ar))] − d2ab − Wl |
| 3 | There be full AC-erase between marks B and C | d3ab + d1cd > AC − AB − Wr + [(Sh/2)*(tan(Al) + tan(Ar))] − d2ab |
| 4 | There be no overwrite of B marks after d4ab | d1cd < AC − AB − [(Sh/2)*(tan(Al) + tan(Ar))] − d2ab |
| 5 | There be no overwrite of D marks after d3cd: | d3cd < AB − [(Sh/2)*(tan(Al) + tan(Ar))] − d2cd − Wl |
| 6 | There be full AC-erase between marks C and D | d1cd + d3cd > AB + [(Sh/2)*(tan(Al) + tan(Ar))] − d2cd − Wl |
| 7 | There be full AC-erase between marks D and A | d3cd + d1ab > CA − AB − Wr + [(Sh/2)*(tan(Al) + tan(Ar))] − d2cd |
| 8 | There be no overwrite of D marks after d4cd | d1ab < CA − AB − [(Sh/2)*(tan(Al) + tan(Ar))] − d2cd |

Where:
AB is the center-to-center distance between the left and right gaps and is equal to Sg (see FIGS. 1A and 2A);
Wl is the width of the left gap in an X-direction;
Wr is the width of the right gap in the X-direction;
Al is the angle of the left gap slanted away from the Y-direction;
Ar is the angle of the right gap slanted away from the Y-direction; and
d1$ab$, d2$ab$, d3$ab$, d4$ab$, d1$cd$, d2$cd$, d3$cd$ and d4$cd$ are sequential segments along the magnetic tape in the X-direction where:
in segment d1$ab$ the current starts at zero and then oscillates at high-frequency between negative and positive current;
in segment d2$ab$ there are N first segments where the current holds at positive (negative) current for a first sub-segment, steps to negative (positive), and holds at negative (positive) for a second sub-segment, the N first segments are interspersed with N−1 segments of high-frequency oscillation between negative and positive current, where N is a positive integer equal to or greater than one;

in segment d3*ab* the current oscillates at high-frequency between negative and positive current and terminates at zero current;

in segment d4*ab* the current is zero or near zero;

in segment d1*cdb* the current starts at zero and then oscillates at high-frequency between negative and positive current;

in segment d2*cd* there are N first segments where the current holds at positive (negative) current for a first sub-segment, steps to negative (positive), and holds at negative (positive) for a second sub-segment, the N first segments are interspersed with N−1 segments of high-frequency oscillation between negative and positive current, where N is a positive integer equal to or greater than one;

in segment d3*cd* the current oscillates at high-frequency between negative and positive current and terminates at zero current;

in segment d4*cd* the current is zero or near zero;

Sh is the width of the servo track in the Y-direction; and the X-direction is defined as the direction of movement of the magnetic storage medium (e.g., magnetic tape) from the right gap to left gap and the Y-direction is defined as a direction, in the surface plane of the medium, perpendicular to the X-direction.

Figure 6:
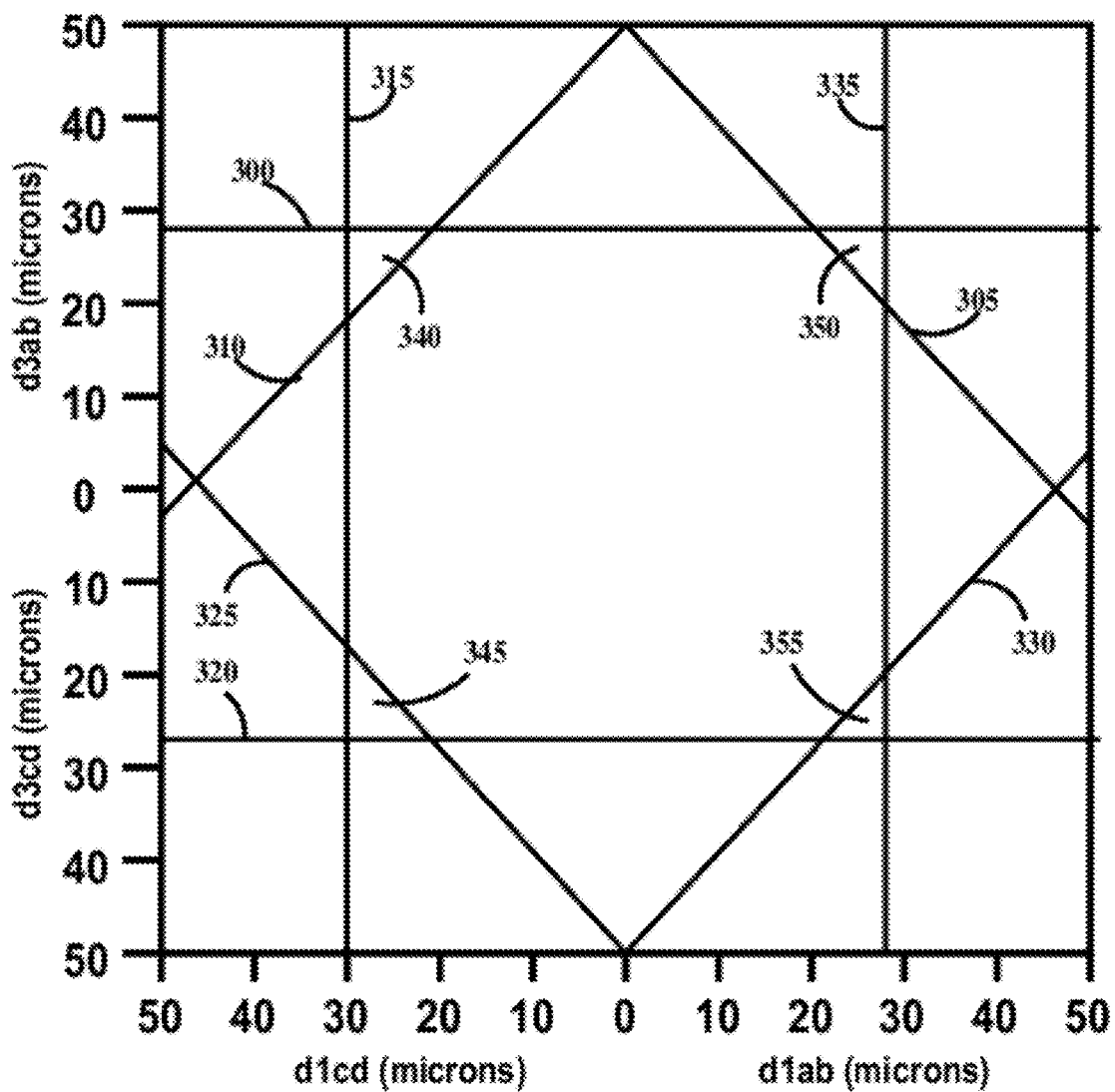
FIG. 6 is an exemplary graphical solution for conditions under which the embodiments of the present invention may be practiced without AC pre-erase on a perpendicular magnetic storage medium or a non-oriented magnetic storage medium.

FIG. 6 is an exemplary graphical solution for conditions under which the embodiments of the present invention may be practiced with self-AC-erase (no need for pre-erase) on a perpendicular magnetic recording medium or a non-oriented magnetic recording medium. In FIG. 6, the values of TABLE II have been substituted into the conditional expressions of TABLE I to produce the plots of FIG. 6.

TABLE II

| Parameter | Symbol | Value | |
|---|---|---|---|
| Sg Distance | AB or Sg | 50 | μm |
| Angle of left gap | Al | 6° | |
| Angle of right gap | Ar | 6° | |
| Left write gap | Wl | 0.3 | μm |
| Right write gap | Wr | 0.3 | μm |
| Servo track width | Sh | 90 | μm |
| AC distance | AC | 100 | μm |
| CA distance | CA | 100 | μm |
| Servo pulse width (x1 + y1, x2 + y2 of FIG. 4) | Together | 1.2 | μm |
| Number of pulses in A and B bursts | these | 4 | |
| Number of pulses in C and D bursts | allow | 5 | |
| Pulse to pulse distance for A and B bursts (S of FIG. 4) | evaluation of d2ab | 3 | μm |
| Pulse to pulse distance for C and D bursts (S of FIG. 4) | and d2cd | 3 | μm |

Note the value of S may be different for A-B and C-D pulse distances

In FIG. 6, condition (1) is plotted by line 300, condition (2) is plotted by line 305, condition (3) is plotted by line 310, condition (4) is plotted by line 315, condition (5) is plotted by line 320, condition (6) is plotted by line 325, condition (7) is plotted by line 330, and condition (8) is plotted by line 335. Regions 340, 345, 350 and 355 are regions where trailing edge servo writing with self-AC-erase is achievable. For example, with d1*ab*=d1*cd*=26 μm, d3*ab*=28 μm and d3*cd*=24 μm all conditions are satisfied.

There are four conditions (with d1*ab*, d3*ab*, d1*cd* and d3*cd* as unknowns) for writing servo tracks after a pre-AC of the servo track with no overwriting of servo marks that, when met, result in no overwriting of servo marks. These conditions are given by the inequalities in Table III:

TABLE III

| In order that: | The following condition must be satisfied: |
|---|---|
| 1 There be no overwrite of B marks after d3ab | d3ab < AB − [(Sh/2)*(tan(Al) + tan(Ar))] − d2ab − Wl |
| 2 There be no overwrite of B marks after d4ab | d1cd < AC − AB − [(Sh/2)*(tan(Al) + tan(Ar))] − d2ab |
| 3 There be no overwrite of D marks after d3cd | d3cd < AB − [(Sh/2)*(tan(Al) + tan(Ar))] − d2cd − Wl |
| 4 There be no overwrite of D marks after d4cd | d1ab < CA − AB − [(Sh/2)*(tan(Al) + tan(Ar))] − d2cd |

Figure 7:
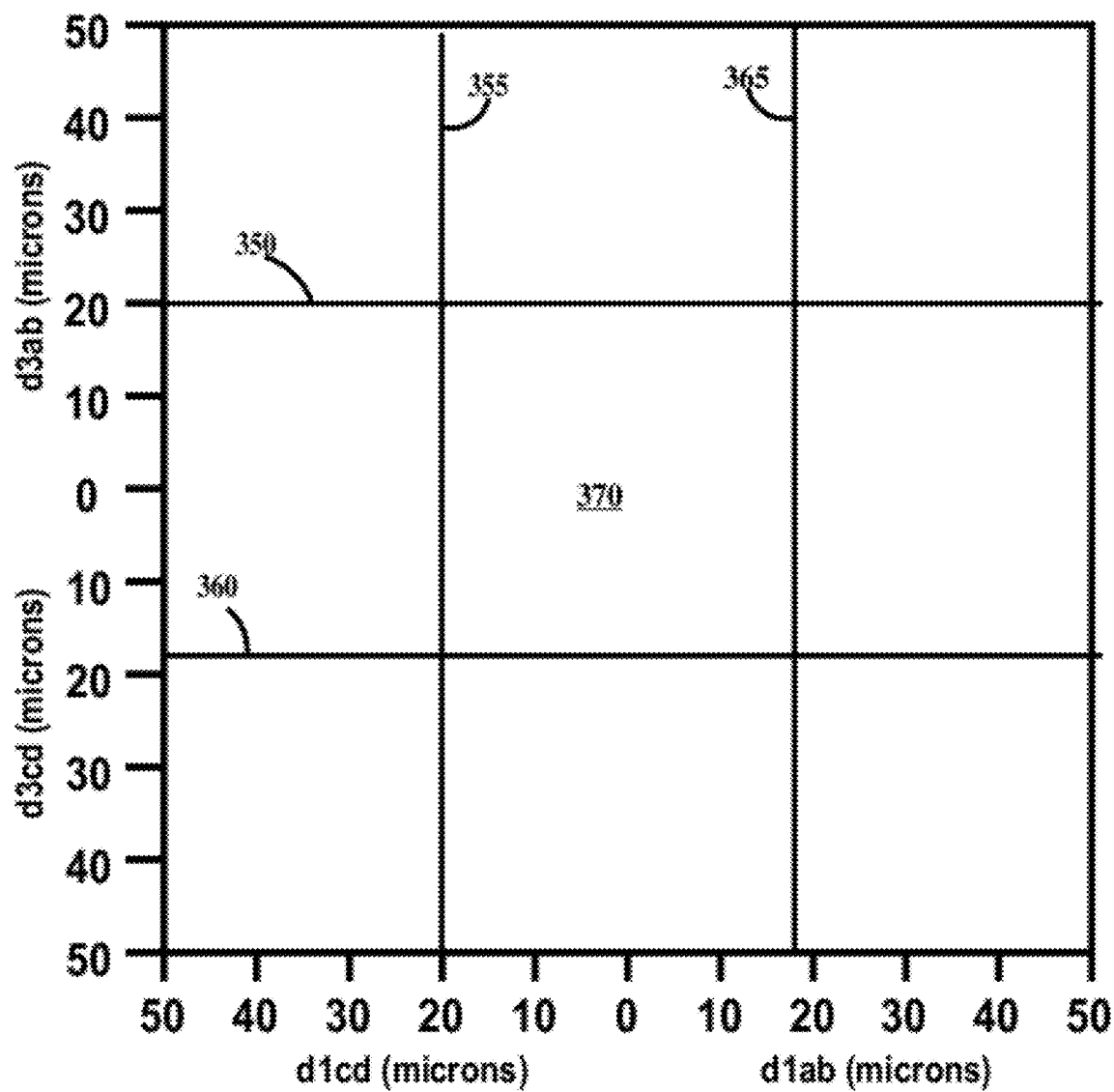
FIG. 7 is an exemplary graphical solution for conditions under which the embodiments of the present invention may be practiced with pre-AC-erase on a perpendicular magnetic storage medium or a non-oriented magnetic storage medium.

FIG. 7 is an exemplary graphical solution for conditions under which the embodiments of the present invention may be practiced with pre-AC-erase on a perpendicular magnetic recording medium or a non-oriented magnetic recording medium. In FIG. 7, the values of TABLE IV have been substituted into the conditional expressions of TABLE III to produce the plots of FIG. 7.

TABLE IV

| Parameter | Symbol | Value | |
|---|---|---|---|
| Sg Distance | AB or Sg | 50 | μm |
| Angle of left gap | Al | 6° | |
| Angle of right gap | Ar | 6° | |
| Left write gap | Wl | 0.3 | μm |
| Right write gap | Wr | 0.3 | μm |
| Servo track width | Sh | 186 | μm |
| AC distance | AC | 100 | μm |
| CA distance | CA | 100 | μm |
| Servo pulse width (x1 + y1, x2 + y2 of FIG. 4) | Together | 1.2 | μm |
| Number of pulses in A and B bursts | these | 4 | |
| Number of pulses in C and D bursts | allow | 5 | |
| Pulse to pulse distance for A and B bursts (S of FIG. 4) | evaluation of d2ab | 3 | μm |
| Pulse to pulse distance for C and D bursts (S of FIG. 4) | and d2cdd | 3 | μm |

Note the value of S may be different for A-B and C-D pulse distances

In FIG. 7, condition (1) is plotted by line 350, condition (2) is plotted by line 355, condition (3) is plotted by line 360, and condition (4) is plotted by line 365. Region 370 is a region where trailing edge servo writing with self-AC-erase on previously AC or DC-erased magnetic tape is achievable. For example, with d1*ab*<17 μm, d1*cd*<20 μm, d3*ab*<20 μm and d3*cd*<17 μm all conditions are satisfied.

Figure 8:
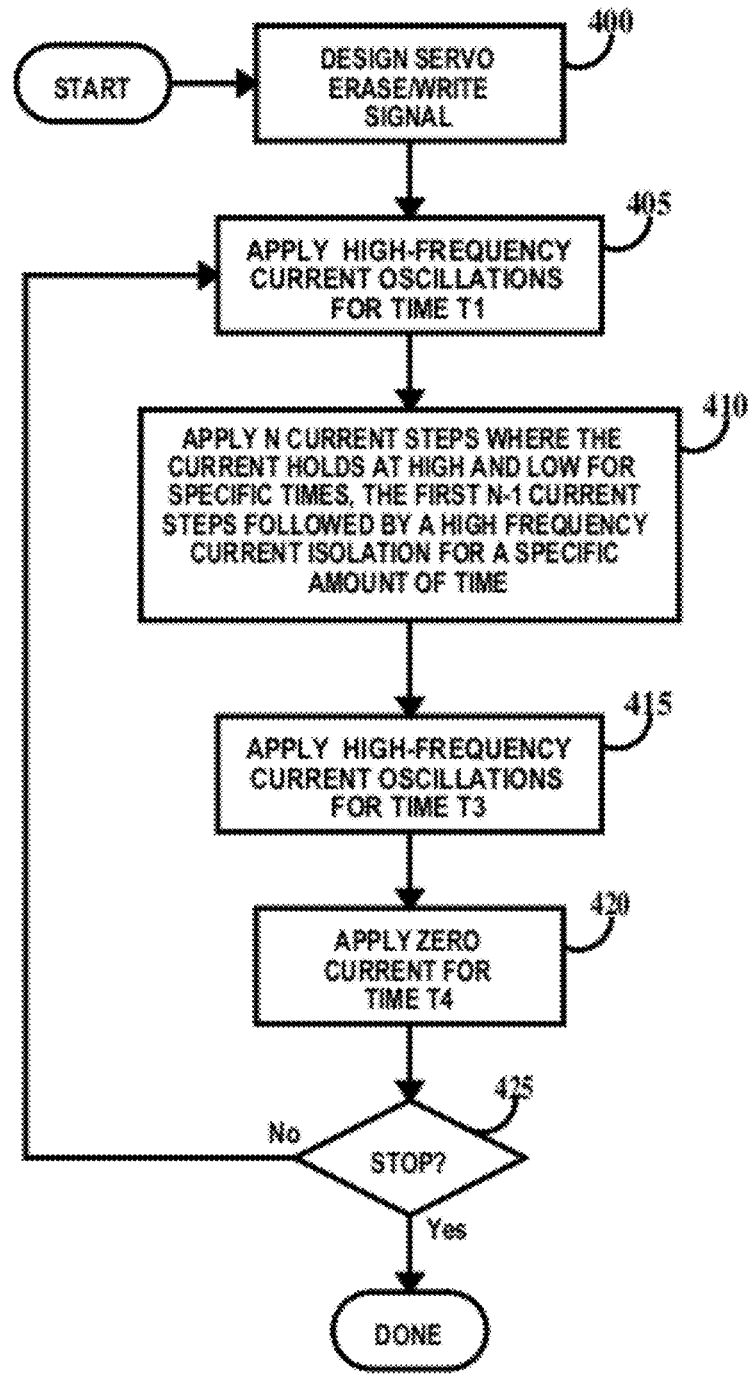
FIG. 8 is a flowchart of the method of writing servo marks with self-AC-erase to a perpendicular magnetic storage medium and a non-oriented magnetic storage medium according to embodiments of the present invention.

FIG. 8 is a flowchart of the method of writing servo marks with self-AC-erase to a perpendicular magnetic storage medium and a non-oriented magnetic storage medium according to embodiments of the present invention. In the following description, except when referring to steps and oscillations between opposite current polarities, "negative" may be substituted for "positive" and "positive" substituted for "negative." In step 400, the servo write signal (e.g., FIG. 4 and/or FIG. 5A) is designed using the conditions of TABLE I or TABLE III and equations (1) and (2). The use of a general purpose computer as an aid in the design of the servo write signal is useful. The servo write signal is supplied to the servo write head (e.g., dual-gap servo write head 100 of FIG. 1A) by the bipolar servo erase/write driver (e.g., 120 of FIG. 1A). The servo write signal is a current signal having four distinct phases. During steps 405 through 420, the magnetic tape is moving at a constant velocity past the servo write head. Signal design techniques include graphical and numeric methods.

In step 405, high-frequency current oscillations between opposite current polarity are applied to erase regions of the servo track across from both gaps of the servo write head for a period of time T1. In one example, over T1 the current oscillations ramp up from zero current to maximum positive and negative values over a first period of time (T1r) and then oscillate between the maximum negative and current values for a second period of time (T1s). In one example, over T1, the current oscillations between the maximum negative and current values for the entire period of time T1.

In step 410, there are N current steps where the current holds at positive maximum current for a third period of time and then steps to negative maximum current and holds at the negative maximum current for a fourth period of time. Between each of the N current steps the current oscillates at high-frequency between maximum negative and maximum positive current for fifth periods of time. During time T2, pairs of N servo marks are written to the servo track across from both gaps and the magnetic tape is erased between current steps.

Alternatively, when the number of AB servo marks is to be different from the number of CD servo marks, in step 410, there are N1 current steps for a time T2(1) or N2 times for a time T2(2). During time T2(1), pairs of N1 marks are written to the servo track across from both gaps. During time T2(2), pairs of N2 marks are written to the servo track across from both gaps. N1 current steps in time T2(1) or N2 current steps in time T2(2) are applied on alternating passes through the loop 405, 410, 415, 420 and 425. N1 and N2 are positive non-equal integers greater than zero. T2(1) may or may not be equal to T2(2).

In step 415, high-frequency current oscillations between opposite current polarity are applied to erase regions of the servo track across from both gaps of the servo write head for a period of time T3. In one example, over T3 the current oscillates between the maximum negative and current values for a sixth period of time (T3s) and then the oscillations ramp down to zero current over a seventh period of time (T3r). In one example, over T3, the current oscillations ramp down to zero current.

In step 420, a zero or near zero current is applied to the servo write head to prevent overwriting of servo marks written in step 410 for a period of time T4.

In step 425 it is determined if writing of servo marks is to be stopped. If not, the method loops back to step 405 otherwise writing of servo marks is terminated.

When the number of AB servo marks is to be different from the number of CD servo marks may be summarized in terms of T1, T2, T3 and T4 where (i) T1, T2, T3 and T4 remain substantially the same, (ii) T1, T2, T3 and T4 alternate between two different values, or (iii) one or more of T1, T2, T3 and T4 remain substantially the same and one or more of T1, T2, T3 and T4 alternate between two different values.

Thus, the embodiments of the present invention provide apparatuses and methods for bipolar writing servo marks to a perpendicular and non-oriented magnetic storage medium using self-AC-erase. It should be understood that while magnetic tape has been used in describing the embodiments of the present invention, the embodiments of the present invention are applicable to any moving magnetic storage medium.

The description of the embodiments of the present invention is given above for the understanding of the present invention. It will be understood that the invention is not limited to the particular embodiments described herein, but is capable of various modifications, rearrangements and substitutions as will now become apparent to those skilled in the art without departing from the scope of the invention. Therefore, it is intended that the following claims cover all such modifications and changes as fall within the true spirit and scope of the invention.

What is claimed is:

1. A method, comprising:

applying a varying current to a servo write head having first and second write gaps to alternately AC-erase and write sets of servo marks to regions of a servo track of a magnetic recording medium proximate to said first and second write gaps, each servo mark of said sets of servo marks comprising first and second abutting magnetic domains of opposite magnetization directions, said magnetic recording medium moving with respect to said first and second write gaps in a recording direction, said magnetic recording medium being either (i) a perpendicular magnetic storage medium having magnetic particles with their easy axes oriented perpendicular to a top surface of said perpendicular storage medium or (ii) a non-oriented magnetic storage medium having magnetic particles with their easy axes randomly oriented relative to a top surface of said non-orientated magnetic storage medium; and wherein applying said varying current includes, in the following order:

(a) for a length of time T1, applying a first oscillating current of high frequency to AC-erase regions of the servo track across from said first and second write gaps, said first oscillating current oscillating between a negative current and a positive current;

(b) for a length of time T2, applying N current steps where the current holds at a first polarity for a first period of time, steps to a second polarity and holds at the second polarity for a second period of time, to write a set of N servo marks to the servo track from each of said first and second write gaps; and between each of said N current steps applying second oscillating currents of high frequency to AC-erase regions of the servo track across from said first and second write gaps, said second oscillating currents oscillating between a negative current and a positive current, where N is a positive integer equal to or greater than one;

(c) for a length of time T3, applying a third oscillating current of high frequency to AC-erase regions of the servo track across from said first and second write gaps, said third oscillating current oscillating with decreasing amplitude between a negative current and a positive current;

(d) for a length of time T4, applying zero current or a current close to zero, so that the magnetic state of said magnetic recording medium does not change, thereby avoiding overwriting servo marks; and repeating (a) through (d) multiple times.

2. The method of claim 1, including:

simultaneously AC-erasing different regions of said servo track as said magnetic recording medium moves past said first and second write gaps in a linear direction from said first write gap toward said second write gap;

simultaneously writing servo marks of said sets of servo marks to different regions of said servo track as said magnetic recording medium moves past said first and second write gaps in a linear direction from said first write gap toward said second write gap; and periodically reducing the magnitude of said varying current to prevent regions of said servo track written by said first write gap from being overwritten or erased by said second write gap as said magnetic recording medium moves past said first and second write gaps in a linear direction from said first write gap toward said second write gap.

3. The method of claim 1, wherein, during servo mark writing said varying current is maintained at a first polarity for a first period of time then steps to an opposite second polarity for a second period of time and is maintained at said second polarity for said second period of time during servo mark writing and wherein widths of servo marks of said sets of servo marks are defined by a time duration of said varying current at said first polarity and said widths of said servo marks are independent of widths of said first and second write gaps.

4. The method of claim 1, including:

moving said magnetic recording medium in a linear direction from said first write gap toward said second write gap;

said first write gap having a first leading edge and an opposite first trailing edge;

said second write gap having a second leading edge and an opposite second trailing edge;

said first trailing edge facing said second leading edge; and wherein edges of servo marks of said sets of servo marks are defined only by said first and second trailing edges.

5. The method of claim 1, wherein:

over a length of time T1*r* said first oscillating current oscillates with increasing amplitude from zero amplitude to a maximum amplitude;

over a length of time T1*s* said first oscillating current oscillates at said maximum amplitude;

over a length of time T3*s* said third oscillating current oscillates at said maximum amplitude; and over a length of time T3*r* said third oscillating current oscillates with decreasing amplitude from said maximum amplitude to zero amplitude.

6. The method of claim 1, including:

wherein the waveform of said varying current signal is based on the equations:

$$AC=d2ab+d3ab+d4ab+d1cd;$$

and $$CA=d2cd+d3cd+d4cd+d1ab;$$

and on the inequalities:

$$d3ab<AB-[(Sh/2)*(\tan(Al)+\tan(Ar))]-d2ab-Wl;$$

$$d1ab+d3ab>AB+[(Sh/2)*(\tan(Al)+\tan(Ar))]-d2ab-Wl;$$

$$d3ab+d1cd>AC-AB-Wr+[(Sh/2)*(\tan(Al)+\tan(Ar))]-d2ab;$$

$$d1cd<AC-AB-[(Sh/2)*(\tan(Al)+\tan(Ar))]-d2ab;$$

$$d3cd<AB-[(Sh/2)*(\tan(Al)+\tan(Ar))]-d2cd-Wl;$$

$$d1cd+d3cd>AB+[(Sh/2)*(\tan(Al)+\tan(Ar))]-d2cd-Wl;$$

$$d3cd+d1ab>CA-AB-Wr+[(Sh/2)*(\tan(Al)+\tan(Ar))]-d2cd;$$

and $$d1ab<CA-AB-[(Sh/2)*(\tan(Al)+\tan(Ar))]-d2cd;$$ and where:

AB is the center-to-center distance between said first and second write gaps;

Wl is the width of said second write gap in an X-direction;

Wr is the width of said first write gap in said X-direction;

Al is the angle the second write gap is slanted away from a Y-direction;

Ar is the angle the first write gap is slanted away from said Y-direction; and d1*ab*, d2*ab*, d3*ab*, d4*ab*, d1*cd*, d2*cd*, d3*cd* and d4*cd* are sequential segments along the magnetic tape in said X-direction where:

in segment d1 ab the current starts at zero and then oscillates at high-frequency between negative and positive current;

in segment d2*ab* there are N1 first segments where the current holds at positive (negative) current for a first sub-segment, steps to negative (positive), and holds at negative (positive) for a second sub-segment, the N1 first segments are interspersed with N1-1 segments of high-frequency oscillation between negative and positive current, where N1 is a positive integer equal to or greater than one;

in segment d3*ab* the current oscillates at high-frequency between negative and positive current and terminates at zero current;

in segment d4*ab* the current is zero or near zero;

in segment d1*cd* the current starts at zero and then oscillates at high-frequency between negative and positive current;

in segment d2*cd* there are N2 first segments where the current holds at positive (negative) current for a first sub-segment, steps to negative (positive), and holds at negative (positive) for a second sub-segment, the N2 first segments are interspersed with N2-1 segments of high-frequency oscillation between negative and positive current, where N2 is a positive integer equal to or greater than one and N1 is or is not equal to N2;

in segment d3*cd* the current oscillates at high-frequency between negative and positive current and terminates at zero current;

in segment d4*cd* the current is zero or near zero;

Sh is the width of said servo track in said Y-direction; and said X-direction is defined as the direction of movement of said magnetic recording medium from said first write gap to said second write gap, and said Y-direction is defined as a direction perpendicular to said X-direction.

7. The method of claim 1, including:

AC-erasing said magnetic recording medium prior to said applying said varying current.

8. The method of claim 7, including:

wherein the waveform of said varying current signal is based on the equations:

$$AC=d2ab+d3ab+d4ab+d1cd;$$

and $$CA=d2cd+d3cd+d4cd+d1ab;$$

and on the inequalities:

$$d3ab<AB-[(Sh/2)*(\tan(Al)+\tan(Ar))]-d2ab-Wl;$$

$$d1cb<AC-AB-[(Sh/2)*(\tan(Al)+\tan(Ar))]-d2ab;$$

$$d3cd<AB-[(Sh/2)*(\tan(Al)+\tan(Ar))]-d2cd-Wl;$$

and $d1ab < CA - AB - [(Sh/2)*(\tan(Al) + \tan(Ar))] - d2cd$; and where:
- AB is the center-to-center distance between said first and second write gaps;
- Wl is the width of said second write gap in an X-direction;
- Wr is the width of said first write gap in said X-direction;
- Al is the angle the second write gap is slanted away from a Y-direction;
- Ar is the angle the first write gap is slanted away from said Y-direction; and
- d1ab, d2ab, d3ab, d4ab, d1cd, d2cd, d3cd and d4cd are sequential segments along the magnetic tape in said X-direction where:
  - in segment d1 ab the current starts at zero and then oscillates at high-frequency between negative and positive current;
  - in segment d2ab there are N1 first segments where the current holds at positive (negative) current for a first sub-segment, steps to negative (positive), and holds at negative (positive) for a second sub-segment, the N1 first segments are interspersed with N1-1 segments of high-frequency oscillation between negative and positive current, where N1 is a positive integer equal to or greater than one;
  - in segment d3ab the current oscillates at high-frequency between negative and positive current and terminates at zero current;
  - in segment d4ab the current is zero or near zero;
  - in segment d1 cd the current starts at zero and then oscillates at high-frequency between negative and positive current;
  - in segment d2cd there are N2 first segments where the current holds at positive (negative) current for a first sub-segment, steps to negative (positive), and holds at negative (positive) for a second sub-segment, the N2 first segments are interspersed with N2-1 segments of high-frequency oscillation between negative and positive current, where N2 is a positive integer equal to or greater than one and N1 is or is not equal to N2;
  - in segment d3cd the current oscillates at high-frequency between negative and positive current and terminates at zero current;
  - in segment d4cd the current is zero or near zero;
  - Sh is the width of said servo track in said Y-direction; and
  - said X-direction is defined as the direction of movement of said magnetic recording medium from said first write gap to said second write gap, and said Y-direction is defined as a direction perpendicular to said X-direction.

9. The method of claim 1, wherein said magnetic recording medium is magnetic tape.

10. An apparatus, comprising:
a bipolar servo erase/write driver configured to generate a varying current to a servo write head to alternately AC-erase a segment of a servo track of a magnetic recording medium and write sets of servo marks to regions of said servo track proximate to spaced apart first and second write gaps of a servo write head, each servo mark of said sets of servo marks comprising first and second abutting magnetic domains of opposite magnetization direction, said servo write head configured to generate corresponding magnetic fields proximate to said first and second write gaps when said varying signal is applied to said servo write head by said bipolar servo erase/write driver;

a component that moves said magnetic recording medium past said first and second write gaps in a direction from said first write gap toward said second write gap, said magnetic recording medium being either (i) a perpendicular magnetic storage medium having magnetic particles with their easy axes oriented perpendicular to a top surface of said perpendicular magnetic storage medium or (ii) a non-oriented magnetic recording medium having magnetic particles with their easy axes randomly oriented to a top surface of said non-orientated magnetic storage medium; and wherein said bipolar servo erase/write driver is configured to generate, in the order recited, a repeating sequence of:
- for a length of time T1, a first high frequency oscillating current oscillating between a negative current and a positive current;
- for a length of time T2, N first current segments where the current holds at a first polarity for a first period of time, steps to a second polarity and holds at the second polarity for a second period of time, said N first current segments interspersed with N-1 second current segments where the current oscillates at high frequency between a negative current and a positive current, and where N is a positive integer equal to or greater than one
- for a length of time T3, a second high frequency oscillating current oscillating between a negative current and a positive current to AC-erase regions of the servo track across from said first and second write gaps, said second oscillating current oscillating with decreasing amplitude between a negative current and a positive current; and
- for a length of time T4, applying zero current or a current close to zero that does not change the magnetic state of said magnetic recording medium.

11. The apparatus of claim 10, wherein said bipolar servo erase/write driver is configured to AC-erase said magnetic recording medium between successive servo marks.

12. The apparatus of claim 10, wherein said servo write head comprises:
a ferromagnetic body having said first and second write gaps, an induction coil wrapped around said ferromagnetic body between said first and second write gaps, opposite ends of said coil electrically connected to respective positive and negative current terminals of said bipolar servo erase/write driver.

13. The apparatus of claim 10, wherein:
- over a length of time T1r said first oscillating current oscillates with increasing amplitude from zero amplitude to a maximum amplitude;
- over a length of time T1s said first oscillating current oscillates at said maximum amplitude;
- over a length of time T3s said third oscillating current oscillates at said maximum amplitude; and
- over a length of time T3r said third oscillating current oscillates with decreasing amplitude from said maximum amplitude to zero amplitude.

14. An apparatus comprising:
a bipolar servo erase/write driver configured to generate a varying current to a servo write head to alternately AC-erase a segment of a servo track of a magnetic recording medium and write sets of servo marks to regions of said servo track proximate to spaced apart first and second write gaps of a servo write head, each servo mark of said sets of servo marks comprising first and second abutting magnetic domains of opposite magnetization direction, said servo write head configured to generate corresponding magnetic fields proximate to said first and second write gaps when said varying signal is applied to said servo write head by said bipolar servo erase/write driver;

a component that moves said magnetic recording medium past said first and second write gaps in a direction from said first write gap toward said second write gap, said magnetic recording medium being either (i) a perpendicular magnetic storage medium having magnetic particles with their easy axes oriented perpendicular to a top surface of said perpendicular magnetic storage medium or (ii) a non-oriented magnetic recording medium having magnetic particles with their easy axes randomly oriented to a top surface of said non-orientated magnetic storage medium; and wherein said bipolar servo erase/write driver is configured to generate, in the order recited, a repeating sequence of:

for a length of time T1(1), a first high frequency oscillating current oscillating between a negative current and a positive current;

for a length of time T2(1), N1 first current segments where the current holds at a first polarity for a first period of time, steps to a second polarity and holds at the second polarity for a second period of time, said N1 first current segments interspersed with N1-1 second current segments where the current oscillates at high frequency between a negative current and a positive current, and where N1 is a positive integer equal to or greater than one;

for a length of time T3(1), a second high frequency oscillating current oscillating between a negative current and a positive current to AC-erase regions of the servo track across from said first and second write gaps, said second oscillating current oscillating with decreasing amplitude between a negative current and a positive current; and for a length of time T4(1), applying zero current or a current close to zero that does not change the magnetic state of said magnetic recording medium;

for a length of time T1(2), a third high frequency oscillating current oscillating between a negative current and a positive current;

for a length of time T2(2), N2 first current segments where the current holds at a first polarity for a first period of time, steps to a second polarity and holds at the second polarity for a second period of time, said N2 first current segments interspersed with N2-1 second current segments where the current oscillates at high frequency between a negative current and a positive current, and where N2 is a positive integer equal to or greater than one and N1 is not equal to N2;

for a length of time T3(2), a fourth high frequency oscillating current oscillating between a negative current and a positive current to AC-erase regions of the servo track across from said first and second write gaps, said fourth oscillating current oscillating with decreasing amplitude between a negative current and a positive current; and for a length of time T4(2), applying zero current or a current close to zero that does not change the magnetic state of said magnetic recording medium; and T1(1) is or is not equal to T1(2), T2(1) is or is not equal to T2(2), T3(1) is or is not equal to T3(2) and T4(1) is or is not equal to T4(2).

15. The apparatus of claim 14, wherein:

over a length of time T1r said first oscillating current oscillates with increasing amplitude from zero amplitude to a maximum amplitude;

over a length of time T1s said first oscillating current oscillates at said maximum amplitude;

over a length of time T3s said second oscillating current oscillates at said maximum amplitude; and over a length of time T3r said second oscillating current oscillates with decreasing amplitude from said maximum amplitude to zero amplitude.

16. The apparatus of claim 10, wherein said servo write head is the only means for writing servo marks to said magnetic recording medium and for AC-erasing said servo tracks.

17. A method comprising:

applying a varying current to a servo write head having first and second write gaps to alternately AC-erase and write sets of servo marks to regions of a servo track of a magnetic recording medium proximate to said first and second write gaps, each servo mark of said sets of servo marks comprising first and second abutting magnetic domains of opposite magnetization directions, said magnetic recording medium moving with respect to said first and second write gaps in a recording direction, said magnetic recording medium being either (i) a perpendicular magnetic storage medium having magnetic particles with their easy axes oriented perpendicular to a top surface of said perpendicular storage medium or (ii) a non-oriented magnetic storage medium having magnetic particles with their easy axes randomly oriented relative to a top surface of said non-orientated magnetic storage medium; and wherein applying said varying current includes, in the following order:

(a) for a length of time T1, applying a first oscillating current of high frequency to AC-erase regions of the servo track across from said first and second write gaps, said first oscillating current oscillating between a negative current and a positive current;

(b) for a length of time T2, applying N current steps where the current holds at a first polarity for a first period of time, steps to a second polarity and holds at the second polarity for a second period of time, to write a set of N servo marks to the servo track from each of said first and second write gaps; and between each of said N current steps applying second oscillating currents of high frequency to AC-erase regions of the servo track across from said first and second write gaps, said second oscillating currents oscillating between a negative current and a positive current, where N is a positive integer equal to or greater than one;

(c) for a length of time T3, applying a third oscillating current of high frequency to AC-erase regions of the servo track across from said first and second write gaps, said third oscillating current oscillating with decreasing amplitude between a negative current and a positive current;

(d) for a length of time T4, applying zero current or a current close to zero, so that the magnetic state of said magnetic recording medium does not change, thereby avoiding overwriting servo marks; and repeating (a) through (d) multiple times wherein N alternates between two different positive integers that are greater than one and (i) T1, T2, T3 and T4 remain substantially the same, (ii) T1, T2, T3 and T4 each alternates between respective two different values, or (iii) one or more of T1, T2, T3 and T4 remain substantially the same and one or more of T1, T2, T3 and T4 alternates between respective two different values.

18. The method of claim 17, including:

over a length of time T1r said first oscillating current oscillates with increasing amplitude from zero amplitude to a maximum amplitude;

over a length of time T1$s$ said first oscillating current oscillates at said maximum amplitude;

over a length of time T3$s$ said third oscillating current oscillates at said maximum amplitude; and over a length of time T31$r$ said third oscillating current oscillates with decreasing amplitude from said maximum amplitude to zero amplitude.

19. The method of claim 17, including:

wherein the waveform of said varying current signal is based on the equations:

$$AC=d2ab+d3ab+d4ab+d1cd;$$

and $$CA=d2cd+d3cd+d4cd+d1ab;$$

and on the inequalities:

$$d3ab<AB-[(Sh/2)*(\tan(Al)+\tan(Ar))]-d2ab-Wl;$$

$$d1ab+d3ab>AB+[(Sh/2)*(\tan(Al)+\tan(Ar))]-d2ab-Wl;$$

$$d3ab+d1cd>AC-AB-Wr+[(Sh/2)*(\tan(Al)+\tan(Ar))]-d2ab;$$

$$d1cd<AC-AB-[(Sh/2)*(\tan(Al)+\tan(Ar))]-d2ab;$$

$$d3cd<AB-[(Sh/2)*(\tan(Al)+\tan(Ar))]-d2cd-Wl;$$

$$d1cd+d3cd>AB+[(Sh/2)*(\tan(Al)+\tan(Ar))]-d2cd-Wl;$$

$$d3cd+d1ab>CA-AB-Wr+[(Sh/2)*(\tan(Al)+\tan(Ar))]-d2cd;$$

$$d1ab<CA-AB-[(Sh/2)*(\tan(Al)+\tan(Ar))]-d2cd;\text{ and}$$

where:

AB is the center-to-center distance between said first and second write gaps;

Wl is the width of said second write gap in an X-direction;

Wr is the width of said first write gap in said X-direction;

Al is the angle the second write gap is slanted away from a Y-direction;

Ar is the angle the first write gap is slanted away from said Y-direction; and d1$ab$, d2$ab$, d3$ab$, d4$ab$, d1$cd$, d2$cd$, d3$cd$ and d4$cd$ are sequential segments along the magnetic tape in said X-direction where:

in segment d1$ab$ the current starts at zero and then oscillates at high-frequency between negative and positive current;

in segment d2$ab$ there are N1 first segments where the current holds at positive (negative) current for a first sub-segment, steps to negative (positive), and holds at negative (positive) for a second sub-segment, the N1 first segments are interspersed with N1-1 segments of high-frequency oscillation between negative and positive current, where N1 is a positive integer equal to or greater than one;

in segment d3$ab$ the current oscillates at high-frequency between negative and positive current and terminates at zero current;

in segment d4$ab$ the current is zero or near zero;

in segment d1$cd$ the current starts at zero and then oscillates at high-frequency between negative and positive current;

in segment d2$cd$ there are N2 first segments where the current holds at positive (negative) current for a first sub-segment, steps to negative (positive), and holds at negative (positive) for a second sub-segment, the N2 first segments are interspersed with N2-1 segments of high-frequency oscillation between negative and positive current, where N2 is a positive integer equal to or greater than one and N1 is or is not equal to N2;

in segment d3$cd$ the current oscillates at high-frequency between negative and positive current and terminates at zero current;

in segment d4$cd$ the current is zero or near zero;

Sh is the width of said servo track in said Y-direction; and said X-direction is defined as the direction of movement of said magnetic recording medium from said first write gap to said second write gap, and said Y-direction is defined as a direction perpendicular to said X-direction.

20. The method of claim 17, including:

AC-erasing said magnetic recording medium prior to said applying said varying current.

21. The method of claim 20, including:

wherein the waveform of said varying current signal is based on the equations:

$$AC=d2ab+d3ab+d4ab+d1cd;$$

and $$CA=d2cd+d3cd+d4cd+d1ab;$$

and on the inequalities:

$$d3ab<AB-[(Sh/2)*(\tan(Al)+\tan(Ar))]-d2ab-Wl;$$

$$d1cb<AC-AB-[(Sh/2)*(\tan(Al)+\tan(Ar))]-d2ab;$$

$$d3cd<AB-[(Sh/2)*(\tan(Al)+\tan(Ar))]-d2cd-Wl;$$

and $$d1ab<CA-AB-[(Sh/2)*(\tan(Al)+\tan(Ar))]-d2cd;\text{ and}$$

where:

AB is the center-to-center distance between said first and second write gaps;

Wl is the width of said second write gap in an X-direction;

Wr is the width of said first write gap in said X-direction;

Al is the angle the second write gap is slanted away from a Y-direction;

Ar is the angle the first write gap is slanted away from said Y-direction; and d1$ab$, d2$ab$, d3$ab$, d4$ab$, d1$cd$, d2$cd$, d3$cd$ and d4$cd$ are sequential segments along the magnetic tape in said X-direction where:

in segment d1$ab$ the current starts at zero and then oscillates at high-frequency between negative and positive current;

in segment d2$ab$ there are N1 first segments where the current holds at positive (negative) current for a first sub-segment, steps to negative (positive), and holds at negative (positive) for a second sub-segment, the N1 first segments are interspersed with N1-1 segments of high-frequency oscillation between negative and positive current, where N1 is a positive integer equal to or greater than one;

in segment d3$ab$ the current oscillates at high-frequency between negative and positive current and terminates at zero current;

in segment d4$ab$ the current is zero or near zero;

in segment d1$cd$ the current starts at zero and then oscillates at high-frequency between negative and positive current;

in segment d2$cd$ there are N2 first segments where the current holds at positive (negative) current for a first sub-segment, steps to negative (positive), and holds at negative (positive) for a second sub-segment, the N2 first segments are interspersed with N2-1 segments of high-frequency oscillation between negative and positive current, where N2 is a positive integer equal to or greater than one and N1 is or is not equal to N2;

in segment d3$cd$ the current oscillates at high-frequency between negative and positive current and terminates at zero current;

in segment d4$cd$ the current is zero or near zero;

Sh is the width of said servo track in said Y-direction; and said X-direction is defined as the direction of movement of said magnetic recording medium from said first write gap to said second write gap, and said Y-direction is defined as a direction perpendicular to said X-direction.

* * * * *